US012434033B2

(12) United States Patent
Lautner et al.

(10) Patent No.: US 12,434,033 B2
(45) Date of Patent: Oct. 7, 2025

(54) GAS DELIVERY DEVICES

(71) Applicant: THE REGENTS OF THE UNIVERSITY OF MICHIGAN, Ann Arbor, MI (US)

(72) Inventors: Gergely Lautner, Ann Arbor, MI (US); Blake Stringer, Ypsilanti, MI (US); Elizabeth J. Brisbois, Athens, GA (US); Mark E. Meyerhoff, Ann Arbor, MI (US); Steven P. Schwendeman, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1203 days.

(21) Appl. No.: 17/279,448

(22) PCT Filed: Sep. 27, 2019

(86) PCT No.: PCT/US2019/053534
§ 371 (c)(1),
(2) Date: Mar. 24, 2021

(87) PCT Pub. No.: WO2020/069368
PCT Pub. Date: Apr. 2, 2020

(65) Prior Publication Data
US 2022/0111173 A1    Apr. 14, 2022

Related U.S. Application Data

(60) Provisional application No. 62/737,484, filed on Sep. 27, 2018.

(51) Int. Cl.
*A61M 16/12* (2006.01)
*A61M 15/00* (2006.01)
(Continued)

(52) U.S. Cl.
CPC ........ *A61M 16/12* (2013.01); *A61M 15/0003* (2014.02); *A61M 16/0003* (2014.02);
(Continued)

(58) Field of Classification Search
CPC .............. A61M 16/12; A61M 16/0003; A61M 16/105; A61M 31/00; A61M 31/002;
(Continued)

(56) References Cited

U.S. PATENT DOCUMENTS 4,969,869 A * 11/1990 Burgin .................. A61M 16/06
604/289
5,877,216 A * 3/1999 Place ................. A61K 31/5575
514/573
(Continued)

FOREIGN PATENT DOCUMENTS

CN        1720443 A1    1/2006
JP      2004065636 A    3/2004
(Continued)

OTHER PUBLICATIONS

Kumari et al., "The design of nitric 1-15 oxide donor drugs: s-nitrosothiol tDodSNO is a superior photoactivated donor in comparison to GSNO and SNAP", European Journal of Pharmacology, 737, 168-176. doi: 10.1016/j.ejphar.2014.05.012, May 22, 2014.

*Primary Examiner* — Colin W Stuart
*Assistant Examiner* — Douglas Y Sul
(74) *Attorney, Agent, or Firm* — Dierker & Kavanaugh, P.C.

(57) ABSTRACT

Gas delivery devices include different examples of nitric oxide (NO) generating systems. Each example of the NO generating system includes a solid, light sensitive NO donor, and a light source that is operatively positioned to selectively expose the solid, light sensitive NO donor to light in order to generate NO gas.

38 Claims, 19 Drawing Sheets

(51) Int. Cl.
*A61M 16/00* (2006.01)
*A61M 16/10* (2006.01)

(52) U.S. Cl.
CPC ..... *A61M 16/105* (2013.01); *A61M 2016/102* (2013.01); *A61M 2202/0275* (2013.01); *A61M 2205/587* (2013.01)

(58) Field of Classification Search
CPC .. A61M 35/00; A61M 35/003; A61M 35/006; A61M 35/10; A61M 35/30; A61M 2202/0275; C01B 21/24
USPC .......................................................... 604/48
See application file for complete search history.

(56) References Cited

U.S. PATENT DOCUMENTS

| | | | | |
|---|---|---|---|---|
| 2003/0131849 | A1* | 7/2003 | Figley | A61M 16/0677 128/205.24 |
| 2007/0144515 | A1* | 6/2007 | Stenzler | A61M 16/04 128/203.12 |
| 2009/0110958 | A1 | 4/2009 | Hyde et al. | |
| 2011/0275978 | A1* | 11/2011 | Hyde | A61N 5/062 604/23 |
| 2014/0275901 | A1* | 9/2014 | Flanagan | A61B 5/7275 600/364 |
| 2014/0294672 | A1 | 10/2014 | Meyerhoff et al. | |
| 2015/0090261 | A1* | 4/2015 | Crosbie | A61M 15/02 128/203.14 |
| 2015/0366831 | A1 | 12/2015 | Brisbois et al. | |
| 2016/0030699 | A1* | 2/2016 | Zapol | A61M 16/10 128/202.26 |
| 2016/0271056 | A1 | 9/2016 | Miller et al. | |
| 2016/0296655 | A1 | 10/2016 | Suschek | |
| 2016/0296738 | A1 | 10/2016 | Suschek | |
| 2016/0339197 | A1 | 11/2016 | Meyerhoff et al. | |
| 2017/0028214 | A1 | 2/2017 | Stasko et al. | |
| 2017/0209663 | A1* | 7/2017 | Miller | A61M 16/125 |
| 2017/0216550 | A1 | 8/2017 | Meyerhoff et al. | |

FOREIGN PATENT DOCUMENTS

| | | |
|---|---|---|
| JP | 2004167284 A | 6/2004 |
| JP | 2016516488 A | 6/2016 |
| JP | 2017504560 A | 2/2017 |
| JP | 2017505148 A | 2/2017 |
| WO | 2004053469 A1 | 6/2004 |
| WO | 2014143842 A1 | 9/2014 |
| WO | WO 2016/201237 | 12/2016 |

\* cited by examiner

GAS DELIVERY DEVICES

CROSS-REFERENCE TO RELATED APPLICATIONS

This application claims the benefit of U.S. provisional application Ser. No. 62/737,484, filed Sep. 27, 2018, the contents of which is incorporated by reference herein in its entirety.

STATEMENT REGARDING FEDERALLY SPONSORED RESEARCH OR DEVELOPMENT

This invention was made with government support under EB024038 and HL127981 awarded by the National Institutes of Health (NIH). The government has certain rights in the invention.

BACKGROUND

Nitric oxide (NO) is an endogenous gas molecule that has been shown to have several important physiological functions, including its unique vasodilating properties, wound healing properties, angiogenesis promoting properties, cancer-fighting potency, anti-platelet activity, and anti-microbial/anti-viral activity. In some instances, NO can be used to control infection, prevent biofilm formation, and minimize inflammation and fibrosis.

The use of NO in inhalation therapy has also been explored. Inhaled nitric oxide has been used to treat lung failure, and has been shown to enhance pulmonary vasodilation and lower pulmonary vascular resistance. Inhaled nitric oxide has also been used to treat neonates with hypoxic respiratory failure, and has been shown to improve oxygenation and to reduce the need for extracorporeal membrane oxygenation therapy. The use of inhaled nitric oxide may prove to be beneficial in other areas as well, such as during lung transplants, for treating pulmonary hypertension, as an inhaled antiseptic agent, etc.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
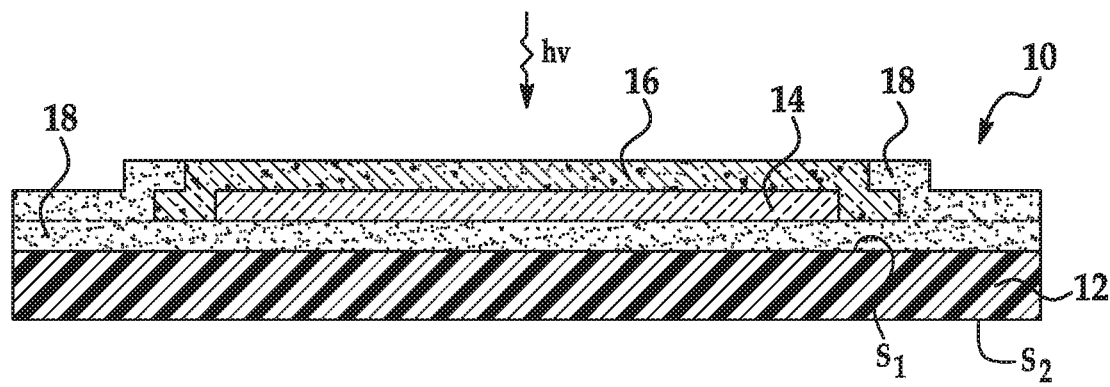
FIGS. 1A through 1E are schematic, cross-sectional view of different examples of nitric oxide (NO) cartridges disclosed herein.

Several examples of gas delivery devices are disclosed herein. In the example devices, nitric oxide (NO) gas is generated photolytically on demand from a solid phase nitric oxide donor that is sensitive to light of particular wavelength(s). The solid phase nitric oxide donor is capable of generating NO gas in-situ in response to light exposure to light. In-situ NO gas generation from these NO donor molecules eliminates the need for nitric oxide tanks (i.e., NO in compressed gas cylinders), which simplifies the device and reduces the cost of the device. Some examples of the gas delivery devices disclosed herein do not include any gas tanks, and thus can be configured as portable inhalation devices. Other examples of the gas delivery devices disclosed herein do include at least a nitrogen gas tank, making these examples less portable, but highly suitable, for example, in a hospital setting.

Moreover, with the example gas delivery devices disclosed herein, the amount of NO that is generated can be precisely controlled by varying the pulse length and/or intensity of the light applied to the solid phase nitric oxide donor. This enables a suitable amount of NO to be generated in order to obtain a desired effect in a particular application. As one example, a steady therapeutic dose (e.g., from about 100 ppbv (parts per billion by volume) to about 100 ppmv (parts per million by volume)) of NO may be generated for inhaled nitric oxide treatments. The concentration of the NO in the output gas stream also depends, at least in part, on the flow rate of the gas(es) utilized. Moreover, with the example gas delivery devices disclosed herein, the amount of $NO_2$ can also be controlled so that it is below a threshold level. In an example, an $NO_2$ level in the output gas is less than 1 parts per million by volume (ppmv), and in some instances, is less than 0.1 ppmv.

In the examples disclosed herein, a nitric oxide donor is used that is in solid form and that is light sensitive. By "solid form," it is meant that the NO donor is not a liquid or a fluid, and is firm and stable in shape. In some examples, the NO donor is in crystalline or powder form. By "light sensitive," it is meant that the NO donor is photolyzable, i.e., is capable of undergoing photolysis when exposed to a particular wavelength or wavelengths of light. In particular, the NO donor is capable of releasing NO gas molecules when exposed to the particular wavelength or wavelengths of light. Examples of the solid, light sensitive NO donor include light sensitive S-nitrosothiols. Some specific examples of light sensitive S-nitrosothiols are selected from the group consisting of S-nitroso-N-acetyl-penicillamine (SNAP) crystals, S-nitrosoglutathione (GSNO) crystals, and combinations thereof.

In the examples disclosed herein, the particular wavelength or wavelengths of light used to generate the nitric oxide may depend, in part, upon the NO donor used and the desired rate of NO release. In an example, the light wavelengths range from about 300 nm to about 600 nm. If a particular wavelength results in a lower than desired rate of NO release, this deficiency may be compensated for by using a higher light power surface density.

Also in the examples disclosed herein, the solid phase, light sensitive nitric oxide donor is immobilized on or in a substrate. By "immobilized," it is meant that the solid, light sensitive nitric oxide donor can be attached to the substrate using an adhesive, or can be doped in or covalently attached to a polymer or other thin film, or can be contained in a cavity formed on the substrate.

NO Cartridges

Several examples of gas delivery devices are disclosed herein. Each of the gas delivery devices includes a nitric oxide generating system, which itself includes an NO cartridge. FIGS. 1A through 1E illustrate five different examples of the NO cartridge.

In FIG. 1A, the NO cartridge 10 includes a substrate 12, the solid, light sensitive NO donor 14 immobilized on a surface $S_1$ of the substrate 12, and an NO permeable and light transparent membrane 16 positioned on the solid, light sensitive NO donor 14.

In this example, the substrate 12 acts as a physical carrier for the NO donor 14. As such, any substrate 12 may be used, including polymers, papers, glasses, metals, etc. In some examples, the substrate 12 may be impermeable to nitric oxide, or may be selected so that nitric oxide has low solubility in the substrate 12. This may be desirable to prevent the substrate 12 from acting as a microreactor for nitrogen dioxide ($NO_2$) generation.

The solid, light sensitive NO donor 14 may be any of the examples set forth herein. While the NO donor 14 is shown as a continuous layer in FIG. 1A, it is to be understood that the NO donor 14 may be crystals or powder particles that are spread across the substrate surface $S_1$.

In this example, the NO donor 14 may be immobilized on the substrate 12 using an adhesive 18. Examples of suitable adhesives 18 include pressure sensitive adhesives, such as elastomers alone or compounded with a tackifier (e.g., a rosin ester). The elastomer can be an acrylic. In some examples, the adhesive 18 may be a liquid or gel that is spread on the substrate 12. In other examples, the adhesive 18 may be a double-sided tape that is adhered on the substrate 12.

The NO donor 14 may be applied to the adhesive 18 using any suitable technique. Upon application, pressure may be applied to the NO donor 14 to assist in adhering the NO donor 14 to the adhesive 18. The adhesive 18 enables a relatively consistent distribution of the NO donor 14 over the surface area of the substrate 12.

This example of the NO cartridge 10 also includes an NO permeable and light transparent membrane 16 positioned on the solid, light sensitive NO donor 14. This example membrane 16 is permeable to nitric oxide. As such, NO that is released from the NO donor 14 can pass through nanopores or micropores of the membrane 16 into a recipient gas stream. This example membrane 16 is also transparent to the wavelength(s) of light used to release the nitric oxide from the NO donor 14. As such, in this example, light of desirable wavelength(s) (shown as hv in FIG. 1A) may be transmitted to the NO donor 14 through the membrane 16. As examples, the membrane 16 may be transparent to one or more wavelengths of light ranging from about 300 nm to about 600 nm.

An example of the NO permeable and light transparent membrane 16 includes polycarbonate, such as polycarbonate track etch membranes. Commercially available NO permeable and light transparent membranes 16 include WHATMAN® NUCLEPORE™ Track-Etched Membranes (from GE Healthcare) and TRAKETCH® (from Sabeu). These membranes 16 may be nanoporous (e.g., diameter ranging from about 1 nm to less than 1000 nm) or microporous (e.g., diameter ranging from about 1 μm to less than 1000 μm).

The NO permeable and light transparent membrane 16 may be positioned on the solid, light sensitive NO donor 14 and adhered to the substrate 12 using the adhesive 18.

Figure 2:
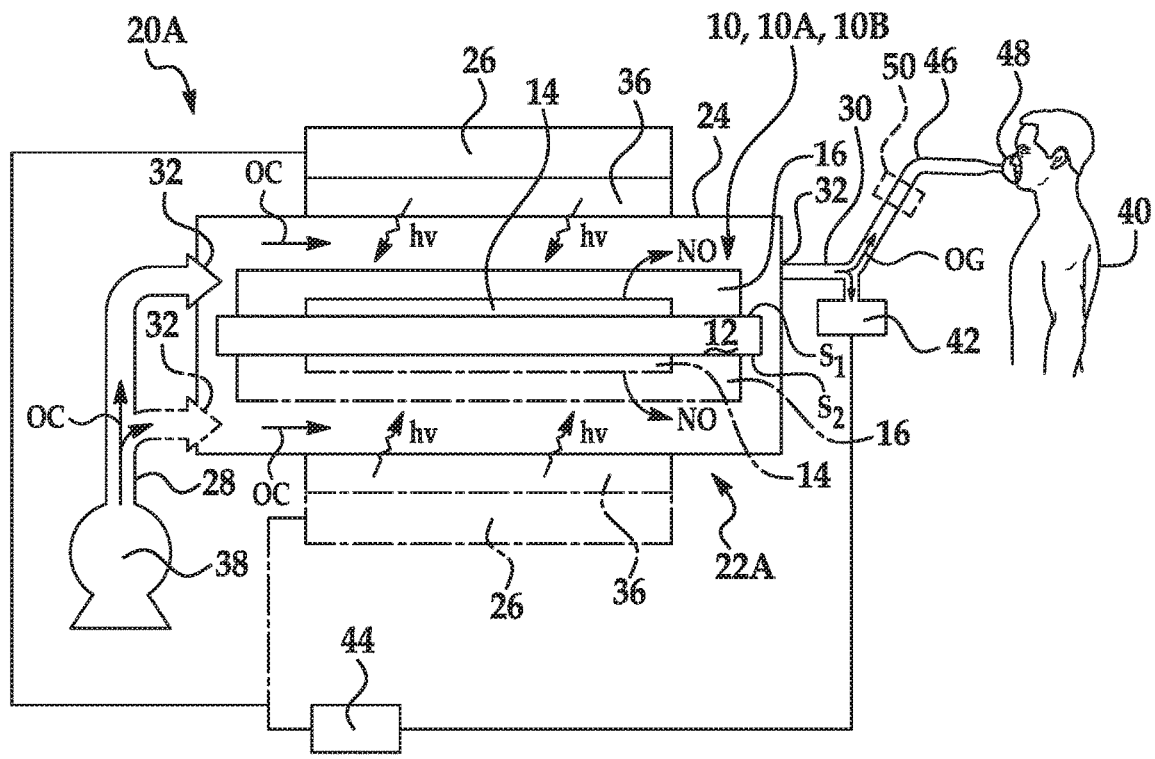
FIG. 2 is a schematic view of an example of a gas delivery device, including the NO cartridge of FIG. 1A or FIG. 1D or FIG. 1E, being used for inhalation therapy.

While not shown in FIG. 1A, the NO cartridge 10 may also include a second solid, light sensitive NO donor adhered to the opposed surface $S_2$, and a second NO permeable and light transparent membrane positioned on the second solid, light sensitive NO donor. This example enables NO to be generated from both sides of the NO cartridge 10. An example of this is shown in FIG. 2.

Figure 1B:
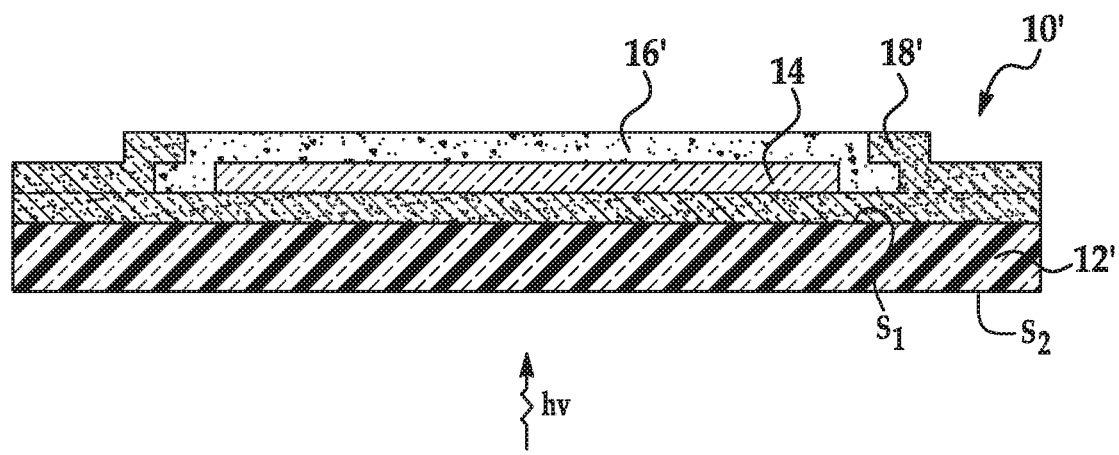

Referring now to FIG. 1B, another example of the NO cartridge 10' includes a light transparent substrate 12', the solid, light sensitive NO donor 14 immobilized on a surface $S_1$ of the light transparent substrate 12', and a porous membrane 16' positioned on the solid, light sensitive NO donor 14.

In this example, the substrate 12' acts as a physical carrier for the NO donor 14 and also enabled light hv to be transmitted to the NO donor 14. As such, in this example, any substrate 12' that is transparent to one or more wavelengths of light ranging from about 300 nm to about 600 nm may be used. An example the light transparent substrate 12' is a transparent polymer (e.g., poly(methylmethacrylate), polyethylene terephthalate, etc.) or a glass material. In some examples, the light transparent substrate 12' may be impermeable to nitric oxide, or may be selected so that nitric oxide has low solubility in the substrate 12'. This may be desirable to prevent the substrate 12' from acting as a microreactor for nitrogen dioxide ($NO_2$) generation.

The solid, light sensitive NO donor 14 may be any of the examples set forth herein. While the NO donor 14 is shown as a continuous layer in FIG. 1B, it is to be understood that the NO donor 14 may be crystals or powder particles that are spread across the substrate surface $S_1$.

In this example, the NO donor 14 may be immobilized on the substrate 12' using a light transparent adhesive 18'. The adhesive 18' may be selected to be transparent to the wavelength of light being used in the application. In some examples, the adhesive 18' is transparent to ultraviolet wavelengths. In other examples, the adhesive 18' is transparent to wavelengths of light ranging from about 300 nm to 600 nm. The NO donor 14 may be applied to the adhesive 18' using any suitable technique. Upon application, pressure may be applied to the NO donor 14 to assist in adhering the NO donor 14 to the adhesive 18'. The adhesive 18' enables a relatively consistent distribution of the NO donor 14 over the surface area of the substrate 12'. The adhesive 18' is also a very thin layer, and thus any absorbance that might otherwise take place is low.

This example of the NO cartridge 10' also includes a porous membrane 16' positioned on the solid, light sensitive NO donor 14. This example membrane 16' may or may not be transparent to the wavelength(s) of light used to release the nitric oxide from the NO donor 14. This example membrane 16' is also porous, and thus permeable to nitric oxide. As such, NO that is released from the NO donor 14 can pass through nanopores or micropores of the membrane 16' into a recipient gas stream. Examples of non-transparent, porous membranes 16' include porous polytetrafluoroethylene (PTFE), polypropylene, polyethylene, polyamide, polyvinylidene difluoride, etc. Examples of transparent, porous membranes 16' include any of the examples provided for the membrane 16. These membranes 16' may be nanoporous or microporous.

The porous membrane 16' may be positioned on the solid, light sensitive NO donor 14 and adhered to the substrate 12' using the adhesive 18' or 18.

For either of the NO cartridges 10, 10', the dimensions of the substrate 12, 12' and the membrane 16, 16', and the amount of the NO donor 14 may depend, in part, upon the dimensions of the gas delivery device in which the cartridge 10, 10' is to be used as well as the desirable rate of NO release. As an example, 300 mg SNAP is enough for generating 10 ppm NO in 4 L/min flow rate for 8 hours. For this example, 4×75 mg of SNAP can be distributed on a 4×40 mm diameter circular surface and covered with a 47 mm microporous membrane. For increasing the NO release duration, flow rate, or concentration, the amount of the NO donor 14 should also be increased. Sheet filter materials (e.g., for the membrane 16, 16') may be available in sizes up to 304 mm×3.04 m, and thus can be cut to any desirable size and/or shape.

Figure 1C:
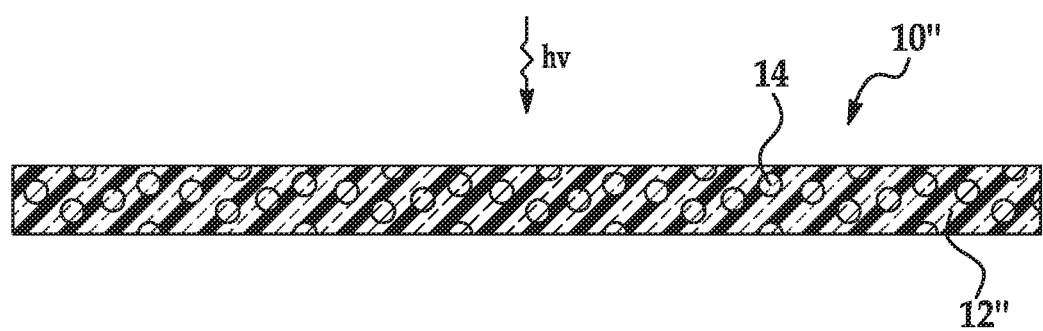

Referring now to FIG. 1C, another example of the NO cartridge 10" includes a substrate 12" and the solid, light sensitive NO donor 14 immobilized in the substrate 12".

In this example, the substrate 12" may be transparent to the light hv that is to be transmitted to the NO donor 14, and may also be permeable to the generated NO gas. Examples of the substrate 12" include silicone rubber, poly(vinyl chloride), polyurethane, etc.

While not shown, it is to be understood that the substrate 12" having the NO donor 14 therein may be positioned on another physical carrier. In these instances, the physical carrier is micro-structured or porous, or the substrate 12" having the NO donor 14 therein is attached to the physical carrier with a limited surface area. These configurations facilitate easy gas transport from the side of the substrate 12" having the NO donor 14 therein facing the physical carrier, and prevent gas build up between the substrate 12" having the NO donor 14 and the physical carrier.

In an example, the NO donor 14 may be immobilized in the substrate 12" using a solvent swelling method. With this method, the solid NO donor 14 is dissolved in a swelling solvent of the substrate 12" at a concentration that exceeds its solubility threshold in the substrate 12". A swelling solvent does not dissolve the substrate 12", but rather, the substrate 12" uptakes the swelling solvent (and the NO donor dissolved therein) and becomes swollen. When the solvent evaporates, the NO donor 14 remains in its crystal form within the bulk of the substrate 12". In another example, the NO donor 14 may be immobilized in the substrate 12" by blending the solid NO donor 14 with an uncured substrate material to form a mixture, casting a film of the mixture, and curing the substrate material. The solid NO donor 14 becomes embedded into the cured substrate 12".

The solid, light sensitive NO donor 14 may be any of the examples set forth herein.

For the NO cartridges 10", the dimensions of the substrate 12", and the amount of the NO donor 14 may depend, in part, upon the dimensions of the gas delivery device in which the cartridge 10" is to be used as well as the desirable rate of NO release. Moreover, the amount of the NO donor 14 may also depend upon the method used to introduce the NO donor 14 to the substrate 12".

Figure 1D:
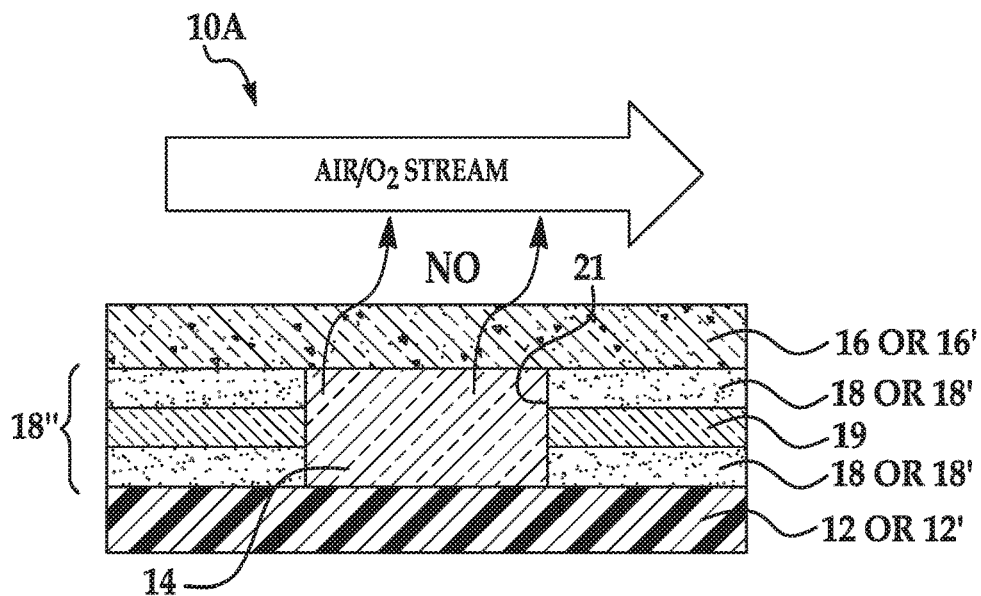
Figure 1E:
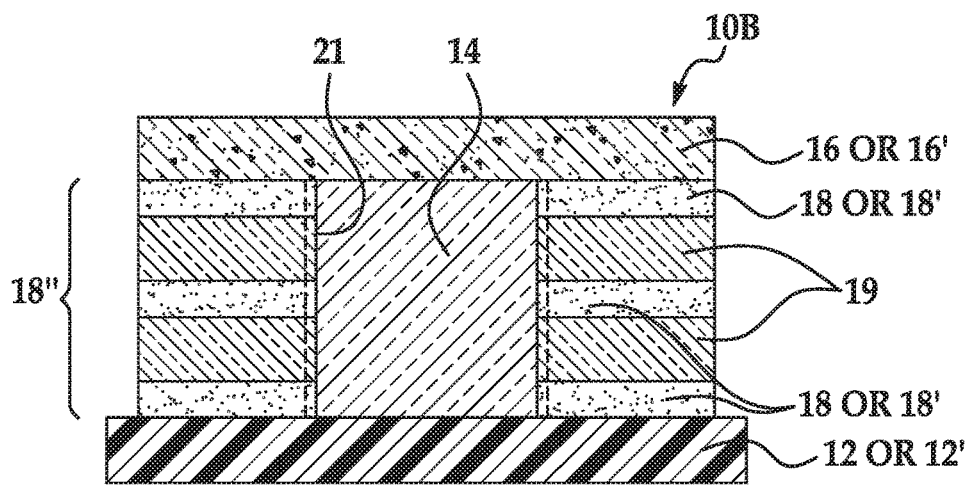

Referring now to FIG. 1D and FIG. 1E, still other examples of the NO cartridge 10A and 10B are depicted. In these examples, the NO donor 14 is introduced and immobilized in one or more cavities 21 that are formed on the substrate 12 or 12'. It has been found that the $NO_2$ level from these NO cartridges 10A, 10B is very low (e.g., <1 ppm), and thus these NO cartridges 10A, 10B may be used without an $NO_2$ scrubber.

These NO cartridges 10A and 10B may include the substrate 12 and the NO permeable and light transparent membrane 16 (as described in reference to FIG. 1A) or the light transparent substrate 12' and the porous membrane 16' (as described in reference to FIG. 1B).

In one example of FIG. 1D and FIG. 1E, the substrate 12 and the NO permeable and light transparent membrane 16 are adhered using an adhesive 18". This example adhesive includes adhesive portions 18 on opposed sides of a core layer 19. In this example, since the light hv is introduced through the light transparent membrane 16, the adhesive 18 and the core layer 19 may not be transparent. Any example of the adhesive 18 disclosed herein may be used, and any non-transparent core layer 19 may be used.

In another example of FIG. 1D and FIG. 1E, the light transparent substrate 12' and the porous membrane 16' are adhered using an adhesive 18". This example adhesive includes adhesive portions 18' on opposed sides of a core layer 19. In this example, since the light hv is introduced through the light transparent substrate 12', the adhesive 18' and the core layer 19 may be transparent. Some examples of the transparent adhesive 18" include 3M™ Optically Clear Adhesive CEF08XX (821X/818X) Series and 3M™ Ultra-clean Laminating Adhesives 501FL and 502FL.

In FIG. 1D, one layer of the adhesive 18" is included, where the single layer 18" includes one core layer 19 and the adhesive 18 or 18' on opposed sides of the one core layer 19. In FIG. 1E, multiple layers of the adhesive 18" are included, which include two or more core layers 19 and the adhesive 18 or 18' on opposed sides of each of the two or more core layers 19. As depicted, the multi-layered adhesive 18" in FIG. 1E includes alternating layers of the adhesive 18 or 18' and the core layers 19, with the adhesive 18 or 18' at the outermost sides to adhere the substrate 12 to the light transparent membrane 16 or to adhere the light transparent substrate 12' to the porous membrane 16'.

Figure 1F:
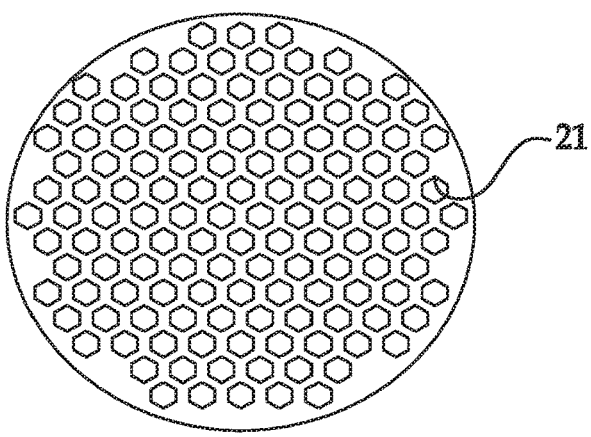
FIG. 1F is a schematic top view of one example of the nitric oxide (NO) cartridges shown in FIGS. 1D and 1E.

As shown in both FIG. 1D and FIG. 1E, a cavity 21 is formed in the adhesive 18". While a single cavity 21 is shown, it is to be understood that any number of cavities may be included. In the top view of FIG. 1F, multiple cavities 21 are included.

In one example, the cavity/cavities 21 are formed into the single or multi-layered adhesive 18" using a cutting plotter. The cavity/cavities 21 may be formed in the adhesive 18" before the adhesive 18" is secured to the substrate 12 or 12'. Liners may be removably attached to the adhesive 18 or 18' at the outermost sides when the cavitiy/cavities 21 are defined in the single or multi-layered adhesive 18". The lateral dimension (e.g., diameter) of each cavity 21 may depend, in part upon the fabrication method, the NO donor 14 particle size, etc. In an example, the lateral dimension ranges from about 0.5 mm to about 10 mm. In another example, the lateral dimension of the cavity 21 is about 1 mm. The depth of each cavity 21 may depend upon the thickness of the adhesive 18". In an example, the depth ranges from about 0.1 mm to about 1 mm.

One of the liners may be removed in order to attach the single or multi-layered adhesive 18" (having the cavity/cavities 22 defined therein) to the substrate 12 or 12'. The other of the liners may remain in place when the NO donor 14 is introduced into the cavity/cavities 21.

The NO donor 14 may be deposited into the cavity/cavities 21 using any suitable technique, such as screen printing, electrostatic deposition, xerography, etc. The solid, light sensitive NO donor 14 may be any of the examples set forth herein.

Once the NO donor 14 is deposited, the other of the liners may be removed, and the light transparent membrane 16 or the porous membrane 16' may be adhered to the adhesive 18".

Gas Delivery Devices

The NO cartridges 10, 10', 10", 10A, 10B may be used in one or more gas delivery devices. FIGS. 2 through 6 illustrate different examples of the gas delivery devices disclosed herein. Each of the gas delivery devices may be used to generate nitric oxide for inhalation therapy. With each device, the method generally involves generating nitric oxide gas by selectively applying light to a solid, light sensitive NO donor; mixing the nitric oxide gas with an oxygen-containing gas to form an output gas stream; and monitoring a nitric oxide level and a nitrogen dioxide level of the output gas stream at least prior to delivery to an inhalation unit. The methods may vary somewhat depending upon the device that is used. As such, each method will be described in more detail with the corresponding gas delivery device.

Referring now to FIG. 2, one example of the gas delivery device 20A is depicted. The gas delivery device 20A is suitable for use with the NO cartridge 10 shown in FIG. 1A or the NO cartridges 10A or 10B shown in FIG. 1D and FIG. 1E. In this example, the gas delivery device 20A includes: i) a nitric oxide (NO) generating system 22A, which includes a chamber 24, the NO cartridge 10, 10A, or 10B contained within the chamber 24 (where the NO cartridge 10, 10A, or 10B includes the substrate 12, the solid, light sensitive NO donor 14 immobilized on the surface $S_1$ of the substrate 12, and the NO permeable and light transparent membrane 16 positioned on the solid, light sensitive NO donor 14), and a light source 26 operatively positioned to selectively expose the solid, light sensitive NO donor 14 to light hv to generate NO gas; ii) an inspiratory gas conduit 28 operatively connected to the chamber 24 to introduce an oxygen-containing gas OC and form an output gas OG including the NO gas; and iii) an outlet conduit 30 to transport a stream of the output gas OG from the NO generating system 22A. While not specifically shown in FIG. 2, it is to be understood that the solid, light sensitive NO donor 14 may be immobilized on the surface $S_1$ of the substrate 12 using an adhesive 18 (e.g., as described in reference to FIG. 1A) or using the cavity/cavities 21 (e.g., as described in reference to FIG. 1D and FIG. 1E).

With the gas delivery device 20A, the method includes: operating the light source 26 to emit light onto the NO donor 14, which photolytically releases NO from the donor 14 within the chamber 24; introducing an oxygen-containing gas OC into the chamber 24, where the NO and the oxygen-containing gas OC mix to form an output gas OG; and transporting the output gas OG from the chamber 24 to a desired destination. Details of this method and the gas delivery device 20A will now be described.

The NO generating system 22A of the device 20A includes the chamber 24 where photolysis takes place (i.e., a photolysis chamber). The chamber 24 may be made of any suitable material that can contain the cartridge 10, and that is not permeable to the oxygen-containing gas OC or to nitric oxide NO. If the light source 26 is positioned outside of the chamber 24 (as shown in FIG. 2), the chamber 24 should be formed of a material that is transparent to the wavelength(s) of light hv emitted by the light source 26. In this example, the chamber may be formed of glass, acrylonitrile butadiene styrene (ABS), low density polyethylene (LDPE), etc. If the light source 26 is positioned inside of the chamber 24, the chamber 24 should be formed of a material that is non-transparent to the wavelength(s) of light hv emitted by the light source 26. In this example, the chamber 24 may be formed of polytetrafluoroethylene (PTFE), high density polyethylene (HDPE), stainless steel, etc.

The chamber 24 may be sealed around an inlet 32 (connected to a conduit 28 used to introduce the oxygen-containing gas OC) and an outlet 34 (connected to a conduit 30 used to transport a stream of the output gas OG). The chamber 24 may also be disposable so that the entire NO generating system 22A can be discarded at the end of its useful life, or the chamber 24 can include an opening through which the NO cartridge 10, 10A, or 10B can be replaced.

The NO generating system 22A also includes the cartridge 10, 10A, or 10B. The NO cartridge 10 may be any of the examples described in reference to FIG. 1A, and the NO cartridge 10A, 10B may be any of the examples described in reference to FIG. 1D or FIG. 1E that includes the substrate 12 and the NO permeable and light transparent membrane 16. In the example shown in FIG. 2, the NO cartridge 10, 10A, or 10B includes the NO donor 14 and the NO permeable and light transparent membrane 16 positioned on both surfaces $S_1$, $S_2$ of the substrate 12, and thus, NO can be generated from both sides of the NO cartridge 10 using separate light sources 26. While not shown in detail in FIG. 2, the NO donor 14 may be positioned on the substrate surfaces $S_1$, $S_2$ with the adhesive 18 or within the cavity/cavities 21.

The NO generating system 22A also includes the light source 26. Any light source 26 may be used that is capable of emitting light that initiates photolysis of the solid, light sensitive NO donor 14. In other words, any light source 26 may be used that is capable of emitting the particular wavelength or wavelengths of light that cause the nitric oxide to be released from the NO donor 14. As such, the light source 26 may depend, in part, upon the NO donor 14 used and the desired rate of NO release. As examples, the light source 26 may be a high intensity light emitting diode (LED), a laser diode, a lamp, etc. Suitable LEDs may be those having a nominal wavelength ranging from about 340 nm to about 600 nm, such as 340 nm, or 385 nm, or 470 nm, or 565 nm.

One or more light sources 26 may be used to release NO from the NO donor 14 positioned on a single surface $S_1$ or $S_2$. The use of multiple light sources may enable further control over the NO release. For example, if higher levels of NO are desirable, all of the light sources 26 facing the surface $S_1$ may be activated to emit light toward the NO donor 14 on the surface $S_1$, and if lower levels of NO are desirable, less than all of the light sources 26 may be activated.

The light source 26 is positioned to selectively expose the NO donor 14 to light hv. The light source 26 may be positioned outside of a light transparent chamber 24 or may be positioned inside of a non-transparent chamber 24. In some examples, the light source 26 may be attached to the chamber 24 (e.g., either inside or outside). In these examples and when the chamber 24 is disposable, the light source 26 may be disposed of with the chamber 24. In these examples and when the chamber 24 is not disposable (but rather receives a disposable cartridge 10), the light source 26 may be reused with several NO cartridges 10. In these examples, the light source 26 may also be removable from the inside or outside of the chamber 24 so that it can be replaced at the end of its useful life. In some other examples, the light source 26 may be attached to a device housing (not shown) that also houses the chamber 24. In these examples, the light source 26 may not be directly attached to the chamber 24, but is positioned to direct the light hv to the NO donor 14 when operated. In these examples, the light source 26 may be removable from the device housing so that it can be replaced at the end of its useful life.

When the light source 26 is attached to the inside of the chamber 24, any adhesive or other suitable securing mechanism may be used to attach the light source 26 to an interior chamber wall. When the light source 26 is attached to the outside of the chamber 24 (as shown in FIG. 2), any light transparent adhesive 36 or other suitable securing mechanism that will not block the light from the light source 26 may be used to attach the light source 26 to an exterior chamber wall. The light source 26 may also be operatively positioned outside of, but not attached to the chamber 24.

Electronic circuitry may be operatively connected to the light source 26 to control when the source(s) 26 is/are turned ON and OFF, the duration of an ON cycle, the intensity, the power surface density, etc. The electronic circuitry may be part of a sensing and feedback system, which will be described in further detail below.

The light source 26 may be turned ON for any time interval up to, for example, 8 hours per cartridge 10, and thus may photolytically release NO during this time interval. Longer time intervals may be possible, depending upon the amount of NO donor 14 in the cartridge 10. When it is desired to stop generating NO, the light source 26 is turned OFF so that light hv is no longer emitted on the NO donor 14. The NO release lifetime may be longer when larger substrates 12 are used and/or when higher amounts of the NO donor 14 are used.

In this example, the NO gas released from the NO donor 14 permeates through the membrane 16 and into the chamber 24. The photolysis of the NO donor 14 may generate aerosol droplets as well as the NO gas. Aerosol droplets are undesirable for various medical applications. It is to be understood that the membrane 16 prevents any aerosol droplets from entering the chamber 14 with the NO gas.

The gas delivery device 20A shown in FIG. 2 also includes the inspiratory gas conduit 28 operatively connected to the chamber 24 (e.g., at inlet 32) to introduce the oxygen-containing gas OC to the chamber 24. The oxygen-containing gas OC may be at least substantially pure oxygen gas $O_2$, or air, or a hypoxic gas that includes oxygen. In this example, the oxygen-containing gas OC may be delivered from any suitable gas source (e.g., compressed gas cylinder (not shown), gas pump 38 that delivers ambient air, etc.), which can regulate the flow of the oxygen-containing gas OC, or can be coupled to a flow controller to regulate the flow of the oxygen-containing gas OC into the inlet 32. Any suitable gas flow rate may be used. As an example, the flow rate of the oxygen-containing gas OC may range from about 50 mL/min to about 5 L/min. In another example, the source or flow controller may regulate the flow of the oxygen-containing gas OC so that the output gas stream OG contains from about 20% oxygen to about 99.99% oxygen. In an example, 100% air saturation may be used as the oxygen-containing gas OC, which corresponds to about 10 mg/L (ppm) of $O_2$ in the output gas stream OG.

The inspiratory gas conduit 28 may be a tube that has low or no permeability to at least the oxygen-containing gas OC and the nitric oxide. Examples of suitable tubing material include poly(vinyl chloride) (PVC), polyurethane (PU), polyethylene (PE), fluorinated polymers, etc.

In the chamber 24, the oxygen-containing gas OC mixes with the photolytically released NO gas to form an output gas stream OG. A stream of the output gas OG may exit the NO generating system 22A through an outlet 34 into the outlet conduit 30. The outlet conduit 30 may be a tube that has low or no permeability to at least the oxygen-containing gas OC and the nitric oxide in the output gas OG. The length of the outlet conduit 30 may also be relatively short in order to avoid nitrogen dioxide ($NO_2$) formation before the stream is delivered to a desirable destination (e.g., a recipient 40). Since the oxygen-containing gas OC is introduced just prior to delivery to the recipient 40, the impact on the NO concentration is minimal or nil due to the short contact time between the NO and the oxygen-containing gas OC.

In some examples, the output gas OG stream may be transported as a result of pressure from the gas source, which may include a regulator to control the flow rate. In other examples, the output gas OG stream may be transported as a result of pressure from a vacuum positioned downstream.

The outlet conduit 30 may be, or may be operatively connected to, a delivery conduit 46. The delivery conduit 46 is operatively connected to an inhalation unit 48, which is capable of transporting the output gas stream OG to a recipient/patient 40. The delivery conduit 46 may be any suitable polymeric or other tubing that is impermeable to the output gas stream OG. In an example, the delivery conduit 46 may also have a one-way valve so that the output gas stream OG does not flow back into the NO generating system 22A. The inhalation unit 48 may be a ventilator, a face mask, a nasal cannula, or some other suitable apparatus for delivering the output gas stream OG to the airways of the patient 40.

The gas delivery device 20A may further include a sensing and feedback system. In an example, the sensing and feedback system includes a sensor 42 in contact with the output gas stream OG to monitor the nitric oxide level (i.e., NO concentration) of the output gas OG, and a controller 44 that is operatively connected to the sensor 42 and the light source 26, where the controller 44 can adjust a parameter of the light source 26 in response to the nitric oxide level from the sensor 42. While not shown, it is to be understood that the sensing and feedback system may also include a separate sensor for monitoring the $NO_2$ concentration.

The sensor(s) 42 may be positioned in contact with the output gas stream OG. The sensor(s) 42 may be positioned in the output conduit 30 or in the delivery conduit 46, or in another conduit that is split or branched off of the output or delivery conduit 30, 46. When the other conduit is used, it receives at some of the output gas stream OG and transports it to the sensor 42. The sensor(s) 42 may be used to monitor the NO levels and the $NO_2$ levels in the output gas stream OG. It may be desirable to monitor the NO level and the $NO_2$ level for feedback control. In particular, feedback control helps to avoid forming $NO_2$ (nitrogen dioxide), which can be generated by the reaction of $O_2$ with NO and can be toxic to the recipient/patient 40.

It may be desirable to position the sensor(s) 42 close to the photolysis chamber (e.g., 24, 24', 52) in order to better feedback control the NO release. It may also be desirable to position the sensor(s) 42 close to the inhalation unit 48 (e.g., within about 3 feet of the inhalation unit 48). This positioning may be desirable to ensure that the gas stream entering the patient 40 has higher levels of NO and lower levels of $NO_2$, although this positioning could also delay the feedback control.

Any suitable NO sensor 42 may be used. In an example, the sensor 42 is an amperometric NO sensor. One type of amperometric sensor is a Shibuki-style sensor (not shown), which is based on the oxidation of NO to nitrate ($NO_3^-$) at an inner platinum (Pt) electrode position behind a gas permeable membrane. In another example, the sensor 42 is a chemiluminescence sensor.

Another example amperometric NO sensor includes working electrode(s) (e.g., platinum, gold, etc.) directly deposited (e.g., by chemical reduction) on the surface of a polymer electrolyte (i.e., an ionomer film). This example of the sensor 42 also includes a reference electrode and a counter electrode, which are immersed in an inner electrolyte solution that also wets the ionomer phase. In this sensor, the portion of the output gas stream OG flows over the surface of the working electrode(s). A positive potential is applied (e.g., about 1V versus Ag/AgCl), and electrochemical reactions occur at the interface of the working electrode(s) and the ionomer film. In an example, the positive potential applied to the working electrode(s) ranges from about 0.2 V to about 1.1 V. The NO in the output gas stream OG electrochemically oxidizes to nitrite/nitrate to output current signals proportional to $NO_{(g)}$ levels.

In other examples, the amperometric NO sensor can include another working electrode on the same surface of the ionomer film as the working electrode(s), and a less positive potential may be applied to that other working electrode so that only $NO_2$ is oxidized (and not NO) and sensed (via current measured). The NO sensor signal can be corrected for any $NO_2$ present using a bipotentiostat. These amperometric NO sensors exhibit relatively rapid response times, and a high surface area of the working electrode(s) yields larger currents than the Shibuki configuration.

As mentioned herein, it is to be understood that another sensor may also be included to monitor the $NO_2$ levels in the output gas stream OG.

Figure 7:
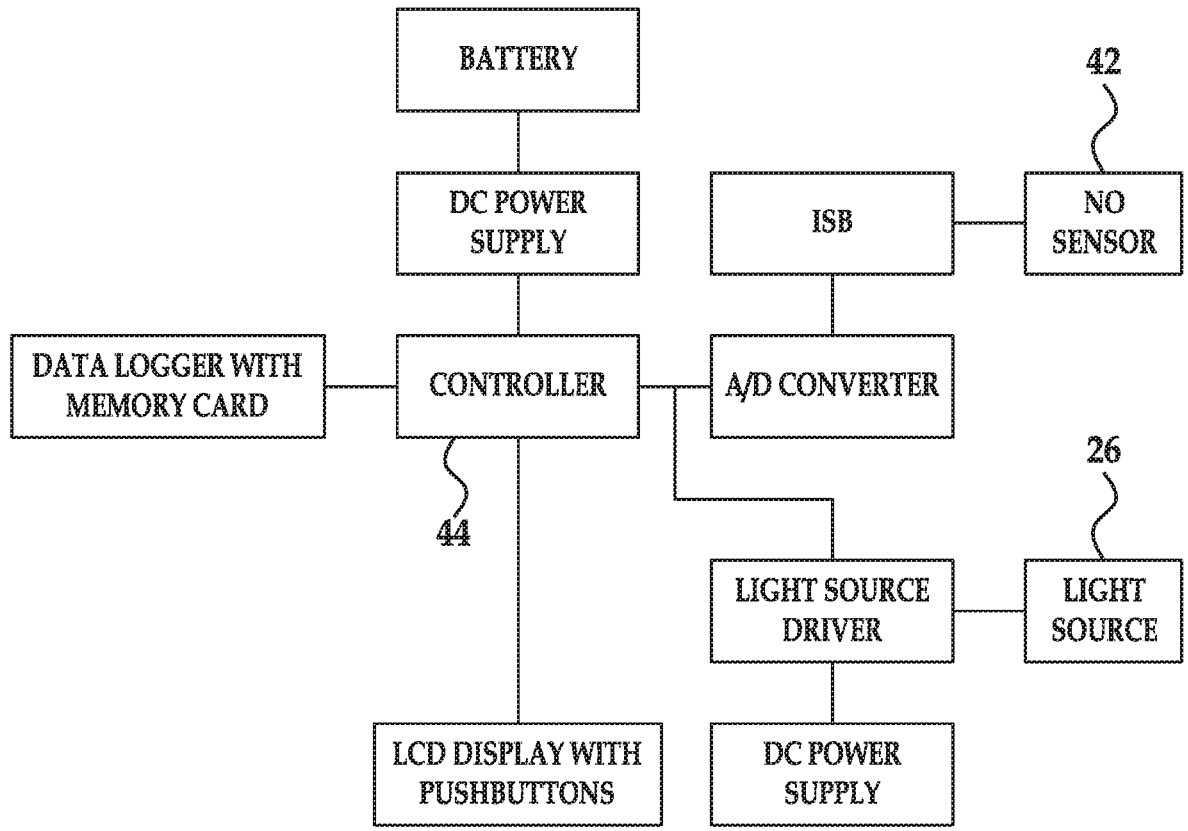
FIG. 7 is a schematic illustration of electronic circuitry used for feedback control in the example gas delivery devices disclosed herein.

The sensor data (i.e., the concentration of NO in the output gas stream OG and/or the concentration of $NO_2$ in the output gas stream OG) is transmitted to the controller 44. In an example, the controller 44 is a PID controller (a proportional-integral-derivative controller). FIG. 7 illustrates a schematic diagram of the electronic circuitry in the sensing and feedback system, including, along the other listed components, the sensor(s) 42, the controller 44, and the light source(s) 26. The ISB is an individual sensor board, which is a potentiostat that keeps the working electrode versus the reference electrode at a constant potential and measures the current. The ISB also converts the measured current to an analog (e.g., 0V–3V or 0V–5V voltage signal or 4 mA–20 mA current) signal which can be easily converted to a digital signal (with the analog digital (A/D) converter) and processed within the controller unit 44. The feedback from the sensor 42 may be used to servo-regulate one or more parameters of the light source(s) 26 to achieve an at least substantially constant concentration of NO at the delivery end. The data may also be used to regulate the flow of the output gas stream OG.

When the sensor data indicates that the NO level is too high or too low, the light source 26 may be turned ON or OFF, the light intensity and/or power surface density may be adjusted, and/or the flow rate of one or more of the gases may be adjusted. In an example, the sensor 42 monitors a nitric oxide level of the output gas stream OG, and based on the nitric oxide level of the output gas stream OG, the controller 44 one of: maintains the current status of the light source(s) 26 (e.g., when the NO is at a desired level); or adjusts the light source(s) 26 to increase NO production (e.g., when the nitric oxide level of the output gas stream OG is below a target level); or adjusts the light source(s) 26 to decrease NO production (e.g., when the nitric oxide level of the output gas stream OG is above the target level). When the sensed NO level is too low, one or more of the light source(s) 26 may be turned ON or turned up. For example, if multiple light sources 26 are included and one is ON when the low level is sensed, an additional light source 26 may be turned ON to increase the NO release rate. When the sensed NO level is too high, one or more of the light source(s) 26 may be turned OFF or turned down. As an example, the light intensity and/or power surface density may be modulated to be increased or decreased in order to increase or decrease, respectively, the rate of NO release, and thus the flux of NO swept from the NO generating device 22A and present in the output gas stream OG.

The target NO level may be based upon the given application in which the NO is being used. The target level may be very low or very high, depending upon the patient 40 and the application. As examples, the target level of NO for a newborn on inhalation therapy may range from about 10 ppm to about 70 ppm, and the target level of NO to be generated in an oxygenator to prevent activation of platelets and other cells during bypass surgery may range from about 190 ppm to about 210 ppm. Further, for antimicrobial applications, such as for lung infections, lower levels of NO may be useful for inhalation therapy, in the range of, for example, from about 500 ppb to about 10 ppm.

The sensor data may also be used to determine whether an undesirable amount of $NO_2$ is present in the output gas stream OG. If an undesirable amount of $NO_2$ is present, an alarm on the device 20A may be initiated and/or the flow rate may be adjusted to reduce the output gas OG delivery from the system 20A and/or the NO level may be adjusted accordingly.

The gas delivery device 20A may also include a nitrogen dioxide ($NO_2$) filter 50. The $NO_2$ filter 50 may be positioned in the delivery conduit 46 to receive the output gas stream OG before it is delivered to the inhalation unit 48. Some examples of the $NO_2$ filter 50 remove at least some of the nitrogen dioxide from the output gas stream OG. As examples, a silica gel filter (with pre-conditioned silica particles) or a soda lime scrubber. These filters 50 may reduce the $NO_2$ to a level that is not physiologically relevant. Other examples of the $NO_2$ filter 50 convert the nitrogen dioxide back into nitric oxide. This conversion is desirable because no NO payload is lost in the form of scavenged (absorbed) $NO_2$, but rather is reduced back into NO. An example of this type of $NO_2$ filter 50 includes ascorbic acid impregnated silica particles.

Figure 3:
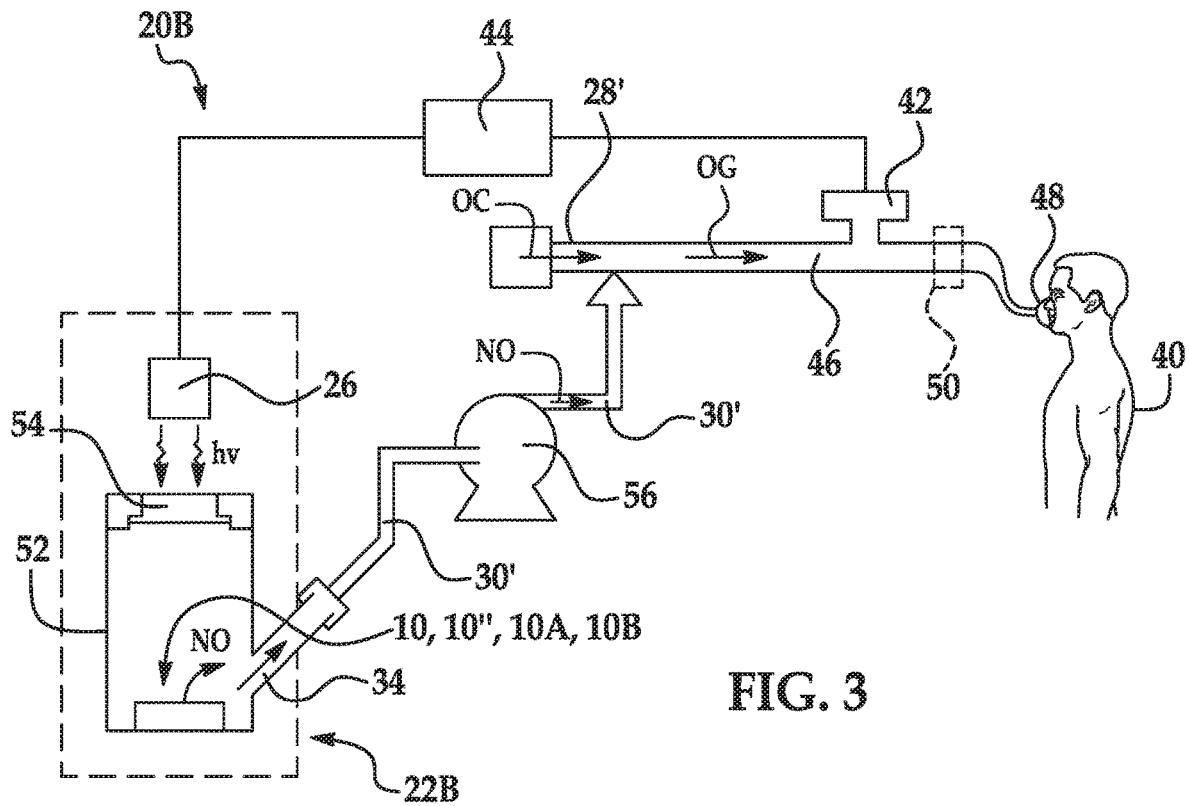
FIG. 3 is a schematic view of another example of a gas delivery device, including the NO cartridge of FIG. 1A or FIG. 1C or FIG. 1D or FIG. 1E, being used for inhalation therapy.

Referring now to FIG. 3, another example of the gas delivery device 20B is depicted. The gas delivery device 20B is suitable for use with the NO cartridge 10 shown in FIG. 1A or with the NO cartridge 10" shown in FIG. 1C or with the NO cartridge 10A, 10B shown in FIG. 1D and FIG. 1E. In this example, the gas delivery device 20B includes: i) a nitric oxide (NO) generating system 22B, which includes a vacuum environment 52, the NO cartridge 10, 10", 10A, or 10B contained within the vacuum environment 52 (where the NO cartridge 10, 10" includes at least the substrate 12 or 12" and the solid, light sensitive NO donor 14 immobilized on the substrate 12 or in the substrate 12"), and a light source 26 operatively positioned to selectively expose the solid, light sensitive NO donor 14 to light hv to generate NO gas; ii) an outlet conduit 30' to transport a stream of the NO gas from the NO generating system 22B; and iii) an inspiratory gas conduit 28' operatively connected to the outlet conduit 30' to introduce an oxygen-containing gas OC and form an output gas OG stream.

With the gas delivery device 20B, the method includes operating the light source 26 to emit light onto the NO donor 14, which photolytically releases NO gas from the donor 14 within the vacuum environment 52; transporting the NO gas from the vacuum environment 52 through an outlet conduit 30'; introducing an oxygen-containing gas OC to the NO gas to form an output gas OG; and transporting the output gas OG to a desired destination.

In the vacuum environment 52, the NO gas is generated in the absence of oxygen, which prevents $NO_2$ from forming. As such, the vacuum environment 52 may be particularly desirable for the NO cartridge 10", which may include a substrate 12" (e.g., silicone rubber) that is permeable to both NO and $O_2$, and thus can act as a microreactor for $NO_2$ generation. Because the vacuum environment 52 is devoid of oxygen, the NO cartridge 10" used in the vacuum environment can effectively photolytically release NO without also generating $NO_2$. It is to be understood that the cartridge 10 (which does not act as a microreactor for $NO_2$ generation) may also be used in the vacuum environment 52.

Details of this method and the gas delivery device 20B will now be described.

The NO generating system 22B of the device 20B includes the vacuum environment 52 where photolysis takes place (i.e., a photolysis chamber). The vacuum environment 52 may be a vacuum chamber may be made of any suitable material that can contain the cartridge 10 or 10" and that can have air and other gases removed by a vacuum pump. Example materials for the vacuum environment 52 include stainless steel, aluminum, brass, high density ceramics, glass or acrylics. When a non-transparent material is used for the vacuum environment 52, the vacuum environment 52 may include a window 54 formed of a material that is transparent to the wavelength(s) of light hv emitted by the light source 26.

The vacuum environment 52 may include an opening through which the NO cartridge 10, 10", 10A, or 10B can be replaced at the end of its useful life.

The vacuum environment 52 also has outlet 34 operatively connected to a vacuum pump 56, which can pump the NO gas out of the vacuum environment 52 into an outlet conduit 30'.

The NO generating system 22B also includes the cartridge 10, 10", 10A, or 10B. The NO cartridge 10 may be any of the examples described in reference to FIG. 1A, or the NO cartridge 10" may be any of the examples described in reference to FIG. 1C, or the NO cartridge 10A, 10B may be any of the examples described in reference to FIG. 1D or FIG. 1E, and the NO cartridge 10A, 10B may be any of the examples described in reference to FIG. 1D or FIG. 1E that includes the substrate 12 and the NO permeable and light transparent membrane 16. It is to be understood that the cartridge 10, 10", 10A, or 10B may be positioned within the vacuum environment so that the NO donor 14 directly faces the light source 26.

The NO generating system 22B also includes the light source 26. The light source 26 may be any of the examples described in reference to FIG. 2. The light source 26 may be positioned to selectively expose the NO donor 14 to light hv. In the device 22B, it may be desirable to position the light source 26 outside of a vacuum environment 52. In some of these examples, the light source 26 may be directly attached to the outside of the vacuum environment 52 via any light transparent adhesive or other suitable securing mechanism that will not block the light from the light source 26. In some other of these examples, the light source 26 may not be attached to the outside of the vacuum environment 52, but rather may be operatively positioned to emit light hv through the window 54 (as shown in FIG. 3).

Electronic circuitry may be operatively connected to the light source 26 to control when the source(s) 26 is/are turned ON and OFF, the duration of an ON cycle, the intensity, the power surface density, etc. In this example device 20B, the light source 26 may be turned ON for any time interval up to, for example, 8 hours per cartridge 10, 10", 10A, or 10B and thus may photolytically release NO during this time interval. Longer time intervals may be possible, depending upon the amount of NO donor 14 in the cartridge 10, 10", 10A, or 10B. When it is desired to stop generating NO, the light source 26 is turned OFF so that light hv is no longer emitted on the NO donor 14. The NO release lifetime may be longer when larger substrates 12 or 12" are used and/or when higher concentrations of the NO donor 14 are used.

In this example, the photolysis of the NO donor 14 generates pure NO gas (i.e., no other gases). Any aerosol droplets that are formed may be i) prevented from entering the vacuum environment 52 by the membrane 16 of the NO cartridge 10, 10A, or 10B or ii) remain trapped within the substrate 12" of the NO cartridge 10", 10A, or 10B.

As such, the NO gas released from the NO donor 14 is the only gas present in the vacuum environment 52. The pure NO gas may be transported out of the vacuum environment 52 as a result of pressure from a vacuum pump 56. The NO gas may be transported through an outlet conduit 30' (which may be formed of the same materials as outlet conduit 30 described in reference to FIG. 2).

The gas delivery device 20B shown in FIG. 3 also includes the inspiratory gas conduit 28' operatively connected to the outlet conduit 30' to introduce the oxygen-containing gas OC to the NO gas within the conduit 30'. The inspiratory gas conduit 28' may be any of the materials described for the inspiratory gas conduit 28. Moreover, the oxygen-containing gas OC may be any of the examples mentioned in reference to FIG. 2 (e.g., pure oxygen gas $O_2$, or air, or a hypoxic gas that includes oxygen) and may be delivered from any of the gas sources mentioned in reference to FIG. 2. The oxygen-containing gas source can include, or be coupled to, a flow controller to regulate the flow of the oxygen-containing gas OC into the inspiratory gas conduit 28'. Any suitable gas flow rate may be used as described herein.

In the inspiratory gas conduit 28', the oxygen-containing gas OC mixes with the photolytically released NO gas to form an output gas stream OG of the device 20B.

In the gas delivery device 20B, the outlet conduit 30' and the inspiratory gas conduit 28' may be operatively connected to, or may be integrally formed with, the delivery conduit 46. The delivery conduit 46 is operatively connected to an inhalation unit 48, which is capable of transporting the output gas stream OG to a recipient/patient 40. The delivery conduit 46 and the inhalation unit 48 may be any of the examples described herein in reference to FIG. 2.

In this example, the length of the inspiratory gas conduit 28' and the delivery conduit 46 may be relatively short in order to avoid $NO_2$ formation before the stream is delivered to a desirable destination (e.g., a recipient 40). Since the oxygen-containing gas OC is introduced just prior to delivery to the recipient 40, the impact on the NO concentration is minimal or nil due to the short contact time between the NO and the oxygen-containing gas OC.

The gas delivery device 20B may further include a sensing and feedback system. In an example, the sensing and feedback system includes the sensor 42 in contact with the output gas stream OG to monitor the nitric oxide level (i.e., NO concentration) of the output gas OG, and a controller 44 that is operatively connected to the sensor 42 and the light source 26, where the controller 44 can adjust a parameter of the light source 26 in response to the nitric oxide level from the sensor 42. The sensor(s) in this example may also be used to monitor the nitrogen dioxide level of the output gas OG. The sensing and feedback system (including the sensor 42, controller 44, and electronic circuitry) may be any of the examples described herein in reference to FIG. 2. The sensor data (i.e., the concentration of NO in the output gas stream OG and/or the concentration of $NO_2$ in the output gas stream OG) may be used as described in reference to FIG. 2, e.g., to increase or decrease NO release from the NO generating system 22B.

The gas delivery device 20B may also include a nitrogen dioxide ($NO_2$) filter 50. The $NO_2$ filter may be positioned in the delivery conduit 46 to receive the output gas stream OG before it is delivered to the inhalation unit 48. Any examples of the $NO_2$ filter 50 described herein may be used in the gas delivery device 20B.

Figure 4:
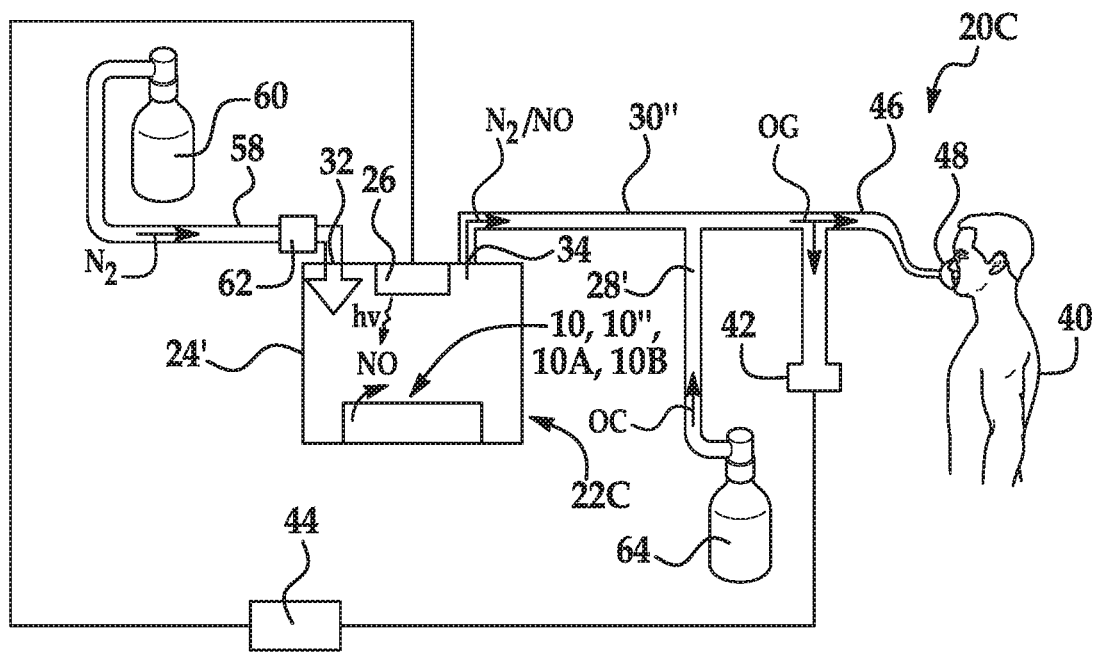
FIG. 4 is a schematic view of still another example of a gas delivery device, including the NO cartridge of FIG. 1A or FIG. 1C or FIG. 1D or FIG. 1E, being used for inhalation therapy.

Referring now to FIG. 4, still another example of the gas delivery device 20C is depicted. The gas delivery device 20C is suitable for use with the NO cartridge 10 shown in FIG. 1A or with the NO cartridge 10" shown in FIG. 1C, or with the NO cartridge 10A or 10B shown in FIG. 1D and FIG. 1E. In this example, the gas delivery device 20C includes: i) a nitric oxide (NO) generating system 22C, which includes a chamber 24, the NO cartridge 10 or 10" contained within the chamber 24' (where the NO cartridge 10, 10", 10A, or 10B includes at least the substrate 12 or 12" and the solid, light sensitive NO donor 14 immobilized on the substrate 12 or in the substrate 12"), and a light source 26 operatively positioned to selectively expose the solid, light sensitive NO donor 14 to light hv to generate NO gas; ii) an inlet conduit 58 to deliver nitrogen gas $N_2$ to the chamber 24'; iii) an outlet conduit 30" to transport a stream of nitrogen gas and NO gas from the chamber 24'; and iv) an inspiratory gas conduit 28" operatively connected to the outlet conduit 30" to introduce an oxygen-containing gas OC and form an output gas OG stream of the device 20C.

With the gas delivery device 20C, the method includes operating the light source 26 to emit light onto the NO donor 14, which photolytically releases NO gas from the donor 14 within the chamber 24'; introducing nitrogen gas into the chamber 24 to sweep the NO gas from the chamber 24'; transporting the $N_2$/NO gas mixture from the chamber 24 through an outlet conduit 30"; introducing an oxygen-containing gas OC to the $N_2$/NO gas mixture to form an output gas OG; and transporting the output gas OG to a desired destination.

In this example, $N_2$ is used as the sweep gas, and thus little or no oxygen is present in the chamber 24'. This renders the device 20C suitable for use with the NO cartridge 10", which may include a substrate 12" (e.g., silicone rubber) that is permeable to both NO and $O_2$, and thus can act as a microreactor for $NO_2$ generation. The $N_2$ sweep gas minimizes the presence of oxygen, and thus the NO cartridge 10" can be used to effectively photolytically release NO without also generating too much (if any) $NO_2$ in the chamber 24'. The $N_2$ sweep gas can be blended into an oxygen-containing gas prior to delivery to a patient. It is to be understood that the cartridge 10 (which does not act as a microreactor for $NO_2$ generation) may also be used in this example.

Details of this method and the gas delivery device 20C will now be described.

The NO generating system 22C of the device 20C includes the chamber 24'. In this example, the chamber 24' may be any examples set forth for the chamber 24 or may be a vacuum environment 52.

The NO generating system 22C also includes the cartridge 10, 10", 10A, or 10B. The NO cartridge 10 may be any of the examples described in reference to FIG. 1A, and the NO cartridge 10" may be any of the examples described in reference to FIG. 1C, and the NO cartridge 10A or 10B may be any of the examples described in reference to FIG. 1D and FIG. 1E that include the substrate 12 and the NO permeable and light transparent membrane 16. It is to be understood that the cartridge 10, 10", 10A, or 10B may be positioned within the chamber 24' so that the NO donor 14 directly faces the light source 26.

In this example, the light source 26 is shown within the chamber 24'. It is to be understood that the light source 26 may alternatively be positioned outside of the chamber 24' in accordance with any of the examples described in reference to FIG. 2 or 3. The light source 26 may also be any of the examples described in reference to FIG. 2 and may be in electrical communication with the electronic circuitry disclosed herein, as long as the light source 26 is positioned to illuminate the NO donor 14 within the chamber 24'.

The chamber 24' includes an inlet 32, which is attached to an inlet conduit 58 that delivers nitrogen gas to the chamber 24'. The nitrogen gas $N_2$ may be supplied to the inlet conduit 58 from a gas source, such as the compressed gas tank 60 or an oxygen scrubber. The compressed gas tank 60 may include compressed nitrogen gas $N_2$, with a regulator to control the flow rate of the nitrogen gas $N_2$ to the inlet conduit 58. The oxygen scrubber (not shown) may be operatively connected to a pump that introduces ambient air into the oxygen scrubber. The ambient air is directed to a solution or particle bed of the oxygen scrubber, which is capable of removing the oxygen from the ambient air to generate the nitrogen gas $N_2$ that is delivered to the inlet conduit 58. The nitrogen gas $N_2$ may be a mixed gas derived from ambient air, where the mixed gas contains nitrogen gas, argon gas, carbon dioxide, and potentially small amounts of other non-oxygen gases. In an example, the oxygen scrubber removes at least 50% of the oxygen from the air, and thus the mixed gas may include less than 10% of oxygen gas. In another example, the oxygen scrubber removes enough oxygen from the air so that the mixed gas includes 5% or less of oxygen gas.

In this example of the device 20C, the inlet conduit 58 delivers the nitrogen gas $N_2$ to the nitric oxide generating system 22C, where NO has been photolytically generated or will be photolytically generated in the manner described herein using the light source 26. The nitrogen purge gas $N_2$ may be introduced directly into the chamber 24', or it may first pass through a flowmeter 62, which measures and controls the linear, nonlinear, mass or volumetric flow rate of the nitrogen purge gas $N_2$.

The nitrogen purge gas ($N_2$) that is introduced into the system 22C picks up the nitric oxide that is generated. The resulting stream of nitrogen gas $N_2$ and nitric oxide $N_2$/NO is then transported out of the system 22C through the outlet 34. Any aerosol droplets that are formed may be i) prevented from entering the chamber 24' by the membrane 16 of the NO cartridge 10, 10A, or 10B or ii) remain trapped within the substrate 12" of the NO cartridge 10", 10A, or 10B. The $N_2$/NO gas stream is transported through the outlet conduit 30".

The gas delivery device 20C shown in FIG. 4 also includes the inspiratory gas conduit 28' operatively connected to the outlet conduit 30" to introduce the oxygen-containing gas OC to the $N_2$/NO gas stream to form the output gas OG of this device 20C. The inspiratory gas conduit 28' may be any of the materials described for the inspiratory gas conduit 28. Moreover, the oxygen-containing gas OC may be any of the examples mentioned in reference to FIG. 2 (e.g., pure oxygen gas $O_2$, or air, or a hypoxic gas that includes oxygen) and may be delivered from any of the gas sources mentioned in reference to FIG. 2. An example of the gas source is an oxygen tank 64, as shown in FIG. 4. The oxygen-containing gas source, e.g., tank 64, can include, or be coupled to, a flow controller to regulate the flow of the oxygen-containing gas OC into the inspiratory gas conduit 28'. Any suitable gas flow rate may be used as described herein. The flow rate of the oxygen-containing gas OC may be continuous or intermittent, and may also depend upon the composition of the oxygen-containing gas OC and the desired fraction of inspired oxygen (i.e., $FiO_2$).

In the gas delivery device 20C, the outlet conduit 30" and the inspiratory gas conduit 28' may be operatively connected to, or may be integrally formed with, a delivery conduit 46. In the delivery conduit 46, the oxygen-containing gas OC mixes with the $N_2$/NO gas stream to form an output gas stream OG of the device 20C.

The delivery conduit 46 is operatively connected to an inhalation unit 48, which is capable of transporting the output gas stream OG to a recipient/patient 40. The delivery conduit 46 and the inhalation unit 48 may be any of the examples described herein in reference to FIG. 2.

In this example, the length of the delivery conduit 46 may be relatively short in order to avoid loss of gas before the stream is delivered to a desirable destination (e.g., a recipient 40). Since the oxygen-containing gas OC is introduced just prior to delivery to the recipient 40, the impact on the NO concentration is minimal or nil due to the short contact time between the NO and the oxygen-containing gas OC.

The gas delivery device 20C may further include a sensing and feedback system. In an example, the sensing and feedback system includes the sensor 42 in contact with the output gas stream OG to monitor the nitric oxide level (i.e., NO concentration) of the output gas OG, and a controller 44 that is operatively connected to the sensor 42 and the light source 26, where the controller 44 can adjust a parameter of the light source 26 in response to the nitric oxide level from the sensor 42. The sensor(s) in this example may also be used to monitor the nitrogen dioxide level of the output gas OG. The sensing and feedback system (including the sensor 42, controller 44, and electronic circuitry) may be any of the examples described herein in reference to FIG. 2. The sensor data (i.e., the concentration of NO in the output gas stream OG and/or the concentration of $NO_2$ in the output gas stream OG) may be used as described in reference to FIG. 2, e.g., to increase or decrease NO release from the NO generating system 22C.

The gas delivery device 20C may also include a nitrogen dioxide ($NO_2$) filter 50. The $NO_2$ filter may be positioned in the delivery conduit 46 to receive the output gas stream OG before it is delivered to the inhalation unit 48. Any examples of the $NO_2$ filter 50 described herein may be used in the gas delivery device 20C.

Figure 5:
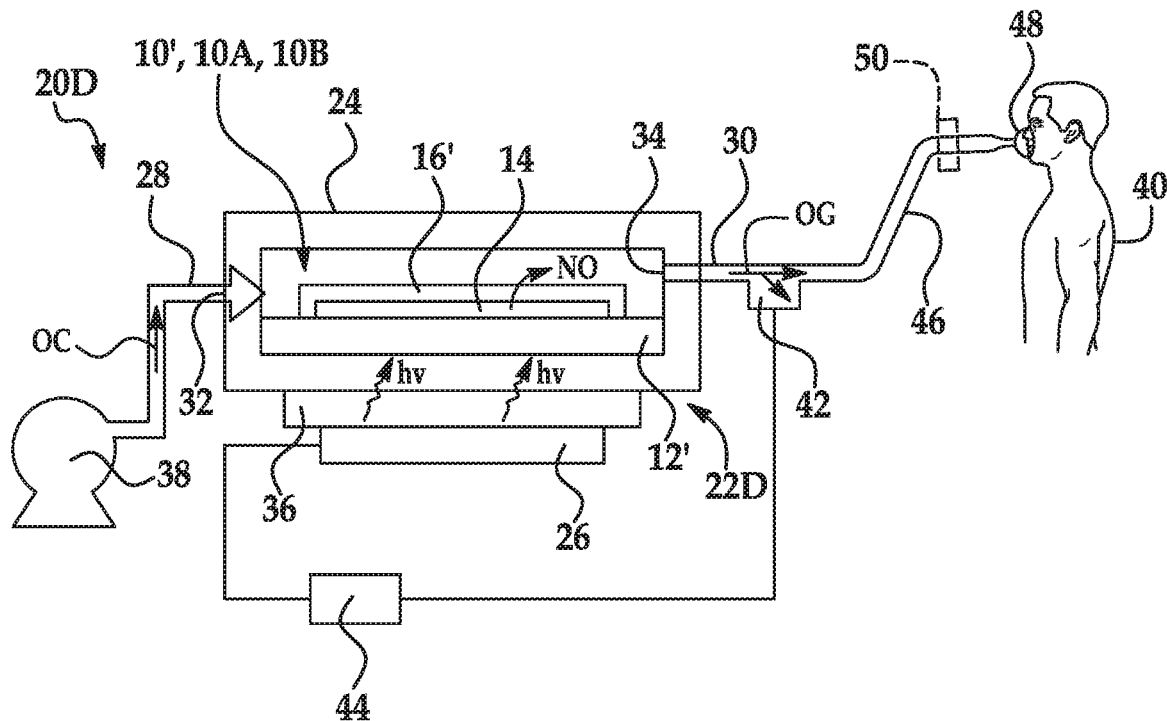
FIG. 5 is a schematic view of yet another example of a gas delivery device, including the NO cartridge of FIG. 1B, being used for inhalation therapy.

Referring now to FIG. 5, another example of the gas delivery device 20D is depicted. The gas delivery device 20D is suitable for use with the NO cartridge 10' shown in FIG. 1B or with some examples of the NO cartridge 10A or 10B. In this example, the gas delivery device 20D includes: i) a nitric oxide (NO) generating system 22C, which includes a chamber 24, the NO cartridge 10', 10A, or 10B contained within the chamber 24 (where the NO cartridge 10', 10A, or 10B includes the light transparent substrate 12', the solid, light sensitive NO donor 14 immobilized on the surface $S_1$ of the light transparent substrate 12', and the porous membrane 16' positioned on the solid, light sensitive NO donor 14), and a light source 26 operatively positioned to selectively expose the solid, light sensitive NO donor 14 to light hv through the light transparent substrate 12' to generate NO gas; ii) an inspiratory gas conduit 28 operatively connected to the chamber 24 to introduce an oxygen-containing gas OC and form an output gas OG including the NO gas; and iii) an outlet conduit 30 to transport a stream of the output gas OG from the NO generating system 22D. While not specifically shown in FIG. 5, it is to be understood that the solid, light sensitive NO donor 14 may be immobilized on the surface $S_1$ of the substrate 12' using an adhesive 18 (e.g., as described in reference to FIG. 1B) or using the cavity/cavities 21 (e.g., as described in reference to FIG. 1D and FIG. 1E).

With the gas delivery device 20D, the method includes: operating the light source 26 to emit light through the light transparent substrate 12' and onto the NO donor 14, which photolytically releases NO from the donor 14 within the chamber 24; introducing an oxygen-containing gas OC into the chamber 24, where the NO and the oxygen-containing gas OC mix to form an output gas OG; and transporting the output gas OG from the chamber 24 to a desired destination. Details of this method and the gas delivery device 20D will now be described.

The NO generating system 22D of the device 20D includes the chamber 24 where photolysis takes place (i.e., a photolysis chamber). The chamber 24 may be any example of the chamber described in reference to FIG. 2.

The NO generating system 22D also includes the cartridge 10', 10A, or 10B. The NO cartridge 10' may be any of the examples described in reference to FIG. 1B, and the NO cartridge 10A, 10B may any of the examples described in reference to FIG. 1D and FIG. 1E that include the light transparent substrate 12' and the porous membrane 16'.

The NO generating system 22D also includes the light source 26. Any light source 26 may be used that is capable of emitting light that can be transmitted through the substrate 12' of the cartridge 10' and that initiates photolysis of the solid, light sensitive NO donor 14. Any of the light sources 26 described herein may be used.

In the example shown in FIG. 5, the light source 26 is positioned to selectively expose the NO donor 14 to light hv through the light transparent substrate 12'. In this example of the NO cartridge 10', 10A, or 10B, the membrane 16' is transparent or non-transparent. As such, when a non-transparent membrane 16' is used, unlike the example shown in FIG. 2, the light source 26 in the device 22D is not positioned to direct light toward the membrane 16', but rather is positioned to direct light toward the light transparent substrate 12'. The light source 25 in the device 22D may be attached or otherwise operatively positioned inside or outside of the chamber 24 using any of the examples disclosed herein, as long as the emitted light can reach the NO donor 14 through the light transparent substrate 12. In the example shown in FIG. 5, the light source 26 is attached to the chamber 24 with the light transparent adhesive 36. In other examples, the chamber 24 may include a window (similar to window 54 in FIG. 3) between the light source 26 and the light transparent substrate 12'.

Electronic circuitry may be operatively connected to the light source 26 to control when the source(s) 26 is/are turned ON and OFF, the duration of an ON cycle, the intensity, the power surface density, etc. The electronic circuitry may be part of a sensing and feedback system as described herein.

The light source 26 may be turned ON for any time interval up to, for example, up to 8 hours per cartridge 10', and thus may photolytically release NO during this time interval. Longer time intervals may be possible, depending upon the amount of NO donor 14 in the cartridge 10'. When it is desired to stop generating NO, the light source 26 is turned OFF so that light hv is no longer emitted on the NO donor 14 through the light transparent substrate 12'. The NO release lifetime may be longer when larger substrates 12' are used and/or when higher amounts of the NO donor 14 are used.

In this example, the NO gas released from the NO donor 14 permeates through the membrane 16' and into the chamber 24. The membrane 16' prevents any aerosol droplets from being generated.

The gas delivery device 20D shown in FIG. 5 also includes the inspiratory gas conduit 28 operatively connected to the chamber 24 (e.g., at inlet 32) to introduce the oxygen-containing gas OC to the chamber 24. The inspiratory gas conduit 28, the oxygen-containing gas OC, and the gas source may be any of the examples mentioned in reference to FIG. 2. The oxygen-containing gas source can also include, or be coupled to, a flow controller to regulate the flow of the oxygen-containing gas OC into the inspiratory gas conduit 28. Any suitable gas flow rate may be used as described herein.

In the chamber 24, the oxygen-containing gas OC mixes with the photolytically released NO gas to form an output gas stream OG. A stream of the output gas OG may exit the NO generating system 22D through an outlet 34 into the outlet conduit 30. The outlet conduit 30 may be a tube that has low or no permeability to at least the oxygen-containing gas OC and the nitric oxide in the output gas OG. The length of the outlet conduit 30 may also be relatively short in order to avoid $NO_2$ formation before the stream is delivered to a desirable destination (e.g., a recipient 40). Since the oxygen-containing gas OC is introduced just prior to delivery to the recipient 40, the impact on the NO concentration is minimal or nil due to the short contact time between the NO and the oxygen-containing gas OC.

In some examples, the output gas OG stream may be transported as a result of pressure from the gas source, which may include a regulator to control the flow rate. In other examples, the output gas OG stream may be transported as a result of pressure from a vacuum positioned downstream.

In the gas delivery device 20D, the outlet conduit 30 may be, or may be operatively connected to, a delivery conduit 46. The delivery conduit 46 is operatively connected to an inhalation unit 48, which is capable of transporting the output gas stream OG to a recipient/patient 40. The delivery conduit 46 and the inhalation unit 48 may be any of the examples described herein in reference to FIG. 2.

The gas delivery device 20D may further include a sensing and feedback system. In an example, the sensing and feedback system includes the sensor 42 in contact with the output gas stream OG to monitor the nitric oxide level (i.e., NO concentration) of the output gas OG, and a controller 44 that is operatively connected to the sensor 42 and the light source 26, where the controller 44 can adjust a parameter of the light source 26 in response to the nitric oxide level from the sensor 42. The sensor(s) in this example may also be used to monitor the nitrogen dioxide level of the output gas OG. The sensing and feedback system (including the sensor 42, controller 44, and electronic circuitry) may be any of the examples described herein in reference to FIG. 2. The sensor data (i.e., the concentration of NO in the output gas stream OG and/or the concentration of $NO_2$ in the output gas stream OG) may be used as described in reference to FIG. 2, e.g., to increase or decrease NO release from the NO generating system 22B.

The gas delivery device 20D may also include a nitrogen dioxide ($NO_2$) filter 50. The $NO_2$ filter may be positioned in the delivery conduit 46 to receive the output gas stream OG before it is delivered to the inhalation unit 48. Any examples of the $NO_2$ filter 50 described herein may be used in the gas delivery device 20D.

Figure 6:
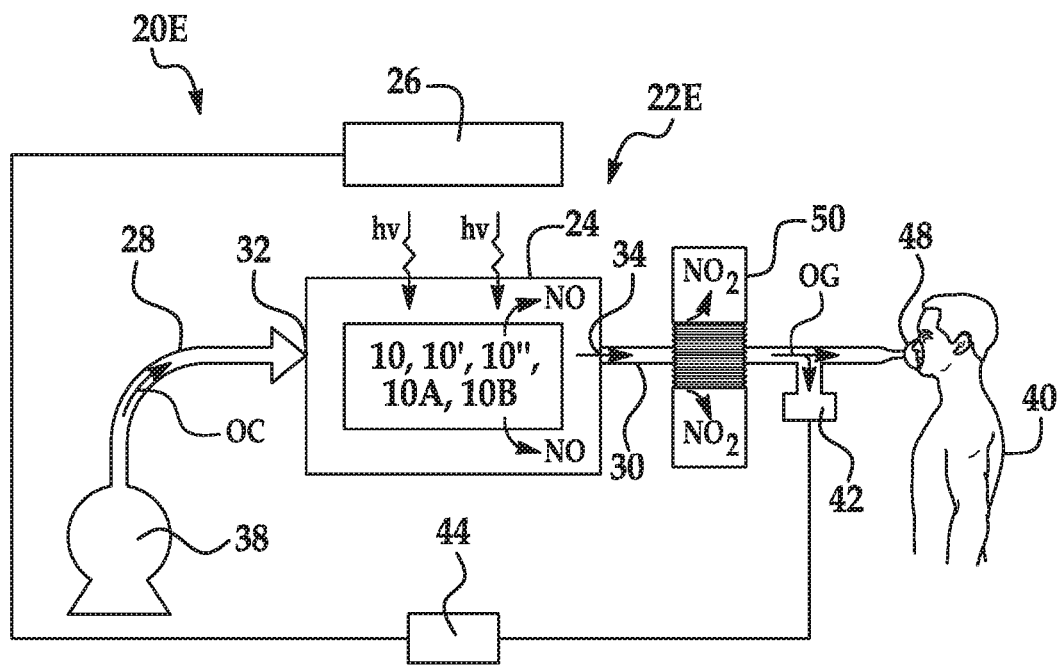
FIG. 6 is a schematic view of yet another example of a gas delivery device, including the NO cartridge of FIG. 1A or FIG. 1B or FIG. 1C or FIG. 1D or FIG. 1E, being used for inhalation therapy.

Referring now to FIG. 6, still another example of the gas delivery device 20E is depicted. The gas delivery device 20E is suitable for use with the NO cartridge 10, 10', 10", 10A, or 10B shown respectively in FIGS. 1A, 1B, 1C, 1D, and 1E. In this example, the gas delivery device 20E includes: i) a nitric oxide (NO) generating system 22E, which includes a chamber 24, the NO cartridge 10, 10', 10", 10A, or 10B contained within the chamber 24, and a light source 26 operatively positioned to selectively expose the solid, light sensitive NO donor 14 to light hv (e.g., directly or through the light transparent substrate 12') to generate NO gas; ii) an inspiratory gas conduit 28 operatively connected to the chamber 24 to introduce an oxygen-containing gas OC to the chamber 24; iii) an outlet conduit 30 to transport a stream of at least the oxygen-containing gas OC and the NO gas from the chamber 24 to a delivery conduit 46; and iv) a nitrogen dioxide filter 50 positioned to receive the stream OG before it is delivered to the delivery conduit 46.

With the gas delivery device 20E, the method includes: operating the light source 26 to emit light onto the NO donor 14, which photolytically releases NO from the donor 14 within the chamber 24; introducing an oxygen-containing gas OC into the chamber 24, where the NO and the oxygen-containing gas OC form a gas mixture; transporting the gas mixture from the chamber 24 to the nitrogen dioxide filter, where $NO_2$ may be reduced or removed to form the output gas OG; and transporting the output gas OG to the delivery conduit 46.

The gas delivery device 20E may be used with any of the cartridges 10, 10', 10", 10A, or 10B, although the cartridges 10, 10', 10A, 10B may generate little to no $NO_2$. The device 20E may be particularly suitable for use with the cartridge 10". As mentioned herein, the NO cartridge 10" may include a substrate 12" (e.g., silicone rubber) that is permeable to both NO and $O_2$, and thus can act as a microreactor for $NO_2$ generation. Because the chamber 24 in this example may include oxygen and has the oxygen-containing gas OC introduced thereto, the NO cartridge 10" may generate $NO_2$ in addition to photolytically releasing the NO gas. The nitrogen dioxide filter 50 may be used to remove the $NO_2$ before delivery of the gas stream to the recipient 40.

Details of this method and the gas delivery device 20E will now be described.

The NO generating system 22E of the device 20E includes the chamber 24 where photolysis takes place (i.e., a photolysis chamber). The chamber 24 may be any example of the chamber described in reference to FIG. 2.

The NO generating system 22E also includes the cartridge 10, 10', 10", 10A, or 10B. The NO cartridge 10, 10', 10", 10A, or 10B may be any of the examples described in reference to FIGS. 1A, 1B, 1C, 1D, and 1E.

The NO generating system 22E also includes the light source 26. Any light source 26 may be used that is capable of emitting light that initiates photolysis of the solid, light sensitive NO donor 14. Any of the light sources 26 described herein may be used. The positioning of the light source 26 in this example will depend upon the NO cartridge 10, 10', 10", 10A, or 10B that is used. For example, the light source 26 may be positioned to emit light toward the NO permeable and light transparent membrane 16 of the NO cartridge 10, 10A, or 10B, or toward the light transparent substrate 12' of the NO cartridge 10', 10A, or 10B, or toward the NO donor immobilized in the substrate 12" of the NO cartridge 10".

Electronic circuitry may be operatively connected to the light source 26 to control when the source(s) 26 is/are turned ON and OFF, the duration of an ON cycle, the intensity, the power surface density, etc. The electronic circuitry may be part of a sensing and feedback system as described herein.

The light source 26 may be turned ON for any time interval up to, for example, 8 hours per cartridge 10, 10', 10", 10A, or 10B and thus may photolytically release NO during this time interval. Longer time intervals may be possible, depending upon the amount of NO donor 14 in the cartridge 10, 10', 10", 10A, or 10B. When it is desired to stop generating NO, the light source 26 is turned OFF so that light hv is no longer emitted on the NO donor 14 through the light transparent substrate 12'. The NO release lifetime may be longer when larger substrates 12, 12', 12" are used and/or when higher amounts of the NO donor 14 are used.

In this example when the NO cartridge 10 or some examples of 10A or 10B is used, the NO gas released from the NO donor 14 permeates through the membrane 16 and into the chamber 24. In this example when the NO cartridge 10' or some examples of 10A or 10B is used, the NO gas released from the NO donor 14 permeates through the membrane 16' and into the chamber 24. In this example when the NO cartridge 10" is used, the NO gas released from the NO donor 14 permeates through the substrate 12" and into the chamber 24.

The gas delivery device 20E shown in FIG. 6 also includes the inspiratory gas conduit 28 operatively connected to the chamber 24 (e.g., at inlet 32) to introduce the oxygen-containing gas OC to the chamber 24. The inspiratory gas conduit 28, the oxygen-containing gas OC, and the gas source may be any of the examples mentioned in reference to FIG. 2. The oxygen-containing gas source can also include, or be coupled to, a flow controller to regulate the flow of the oxygen-containing gas OC into the inspiratory gas conduit 28. Any suitable gas flow rate may be used as described herein.

In the chamber 24, the oxygen-containing gas OC mixes with the photolytically released NO gas. When the NO cartridge 10" is used, the substrate 12" may act as a microreactor for the NO and the oxygen gas, and thus some nitrogen dioxide may be formed in the chamber 24. As such, in some examples of the NO generating system 22E, the gas mixture in the chamber 24 includes NO gas, the oxygen-containing gas OC, and $NO_2$.

In this device 20E, the gas mixture in the chamber 24 is transported through an outlet 34 into the outlet conduit 30. The outlet conduit 30 may be a tube that has low or no permeability to at least the oxygen-containing gas OC and the nitric oxide in the output gas OG.

In some examples, gas mixture may be transported as a result of pressure from the gas source, which may include a regulator to control the flow rate. In other examples, the gas mixture may be transported as a result of pressure from a vacuum positioned downstream.

In the gas delivery device 20E, the outlet conduit 30 may be, or may be operatively connected to, a delivery conduit 46. However, in this example device 20E, the nitrogen dioxide ($NO_2$) filter 50 is positioned between the two conduits 30, 46. The $NO_2$ filter 50 receives the gas mixture to remove any $NO_2$ or to reduce the amount of $NO_2$ and to form the output gas stream OG of this device 20E. Any examples of the $NO_2$ filter 50 described herein may be used in the gas delivery device 20E.

In this example, the output gas stream OG may then be transported from the $NO_2$ filter 50, through the delivery conduit 46, and to the inhalation unit 48, which is capable of delivering the output gas stream OG to a recipient/patient 40. The delivery conduit 46 and the inhalation unit 48 may be any of the examples described herein in reference to FIG. 2.

The gas delivery device 20E may further include a sensing and feedback system. In an example, the sensing and feedback system includes the sensor 42 in contact with the output gas stream OG to monitor the nitric oxide level (i.e., NO concentration) and the nitrogen dioxide level (i.e., $NO_2$ concentration) of the output gas OG after it has passed through the $NO_2$ filter 50. The sensing and feedback system may further include the controller 44 that is operatively connected to the sensor(s) 42 and the light source 26, where the controller 44 can adjust a parameter of the light source 26 in response to the nitric oxide level and/or the nitrogen dioxide from the sensor(s) 42.

The sensing and feedback system (including the sensor 42, controller 44, and electronic circuitry) may be any of the examples described herein in reference to FIG. 2. The sensor data (i.e., the concentration of NO in the output gas stream OG and/or the concentration of $NO_2$ in the output gas stream OG) may be used as described in reference to FIG. 2, e.g., to increase or decrease NO release from the NO generating system 22E.

It is to be understood that any of the example NO cartridges 10, 10', 10", 10A, or 10B may be organized in a parallel arrangement in order to increase the NO release from any of the gas delivery devices 20A through 20E.

Figure 8A:
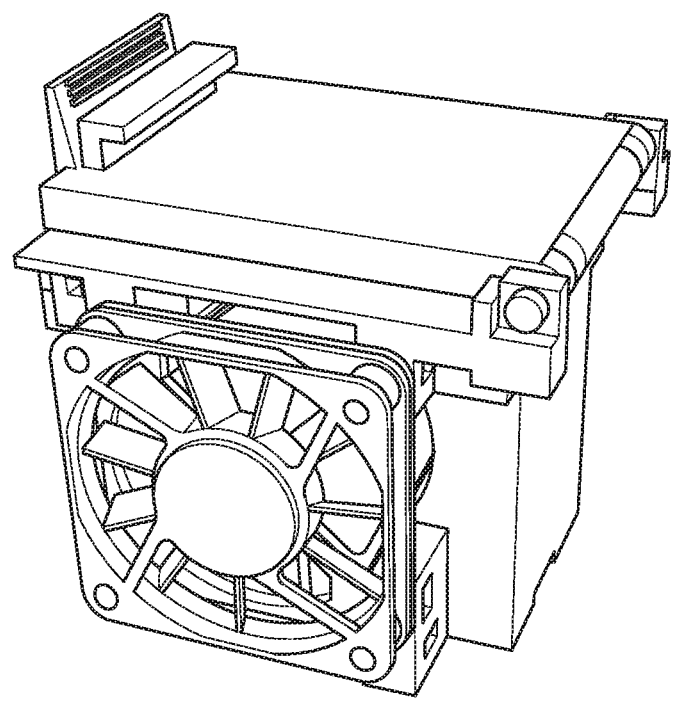
FIGS. 8A and 8B are perspective and semi-schematic illustrations of portable configurations for the example gas delivery devices disclosed herein.
Figure 8B:
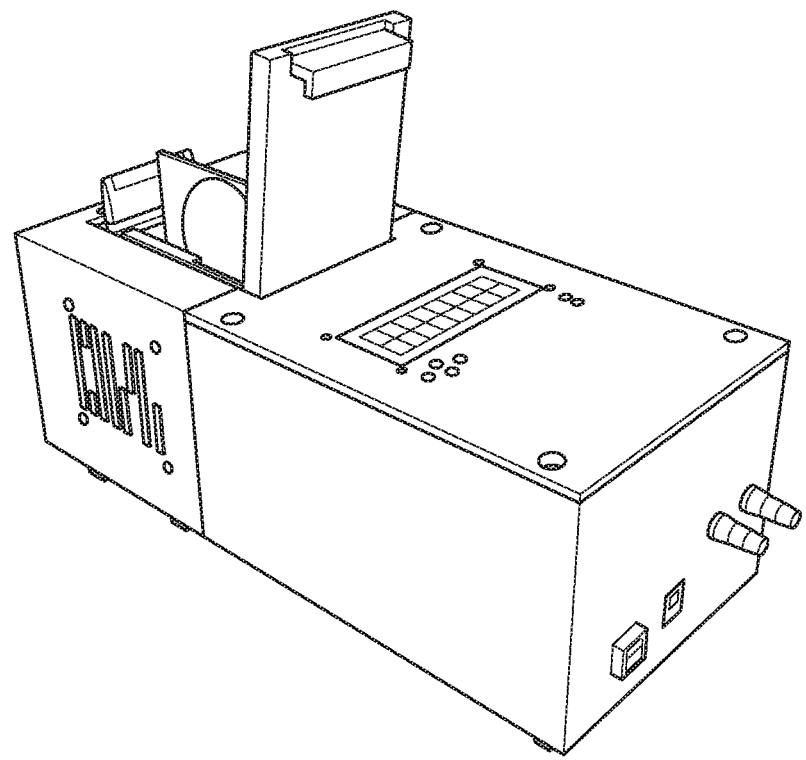

While not shown in FIGS. 2 through 6, it is to be understood that the gas generating devices 20A through 20E may be incorporated into portable or stationary housings that may also include electronic circuitry, user interface panels, sensors, filters, gas pumps, etc. Two example portable device configurations are shown in FIGS. 8A and 8B.

To further illustrate the present disclosure, examples are given herein. It is to be understood that these examples are provided for illustrative purposes and are not to be construed as limiting the scope of the present disclosure.

EXAMPLES

Example 1

In this example, two different NO donors, namely S-nitroso-N-acetylpenicillamine (SNAP) crystals or solid S-nitrosoglutathione (GSNO), were respectively doped into polydimethylsiloxane (PDMS) films. These examples were representative of the NO cartridge 10" shown in FIG. 1C.

The respective crystals or solid powders were blended with uncured silicone rubber, and the blends were cast into films and then cured. The SNAP crystal concentration or the solid GSNO concentration in the films was 13 wt % and the films had 3 mm diameters.

LED light sources with nominal wavelengths of 385 nm, 470 nm, and 565 nm were used to expose the films to light in order to initiate photolysis and generate NO gas. The light power surface density was set to 51 $mW/cm^2$ for each light source. An amperometric sensor was used to detect the NO levels.

Figure 9A:
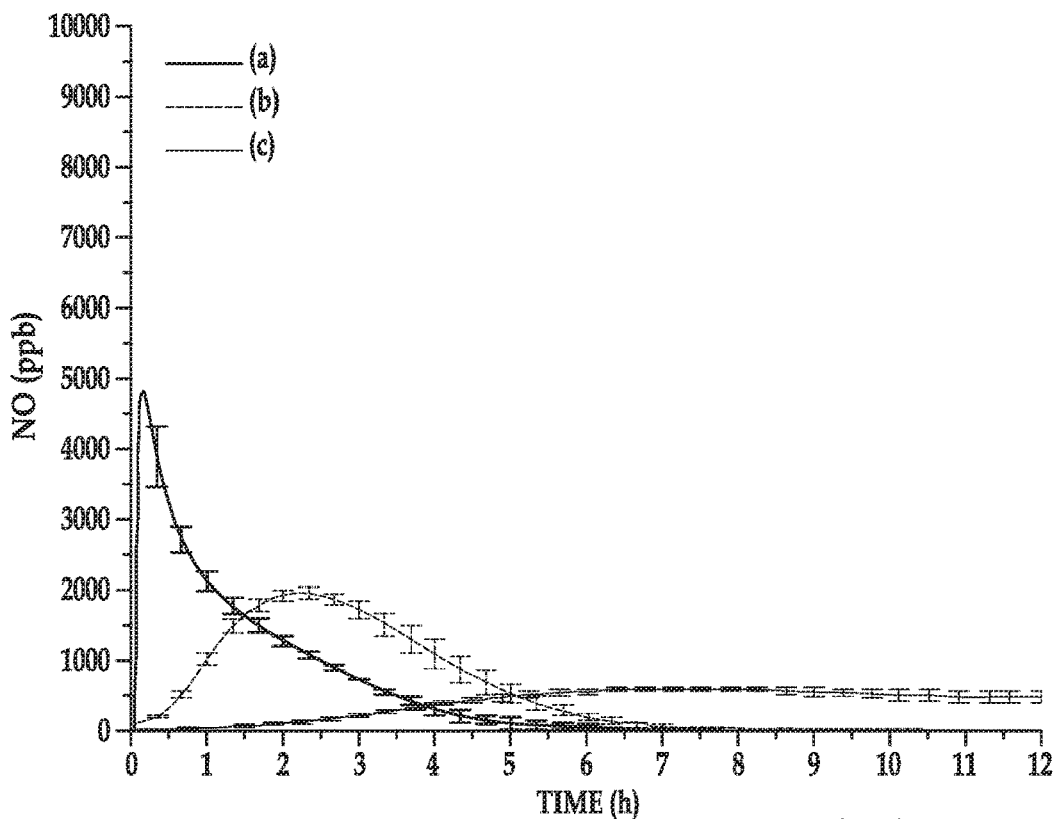
FIGS. 9A and 9B are graphs illustrating 9A) the kinetics of gas phase NO levels and 9B) the cumulative NO release from 3 mm diameter, 13 wt % polydimethylsiloxane (PDMS)-S-nitroso-N-acetyl-penicillamine (SNAP) doped films using (a) 385 nm, (b) 470 nm, and (c) 565 nm light emitting diode (LED) light sources (curves show the mean values and the error bars correspond to the standard error of the mean of three parallel measurements)
Figure 9B:
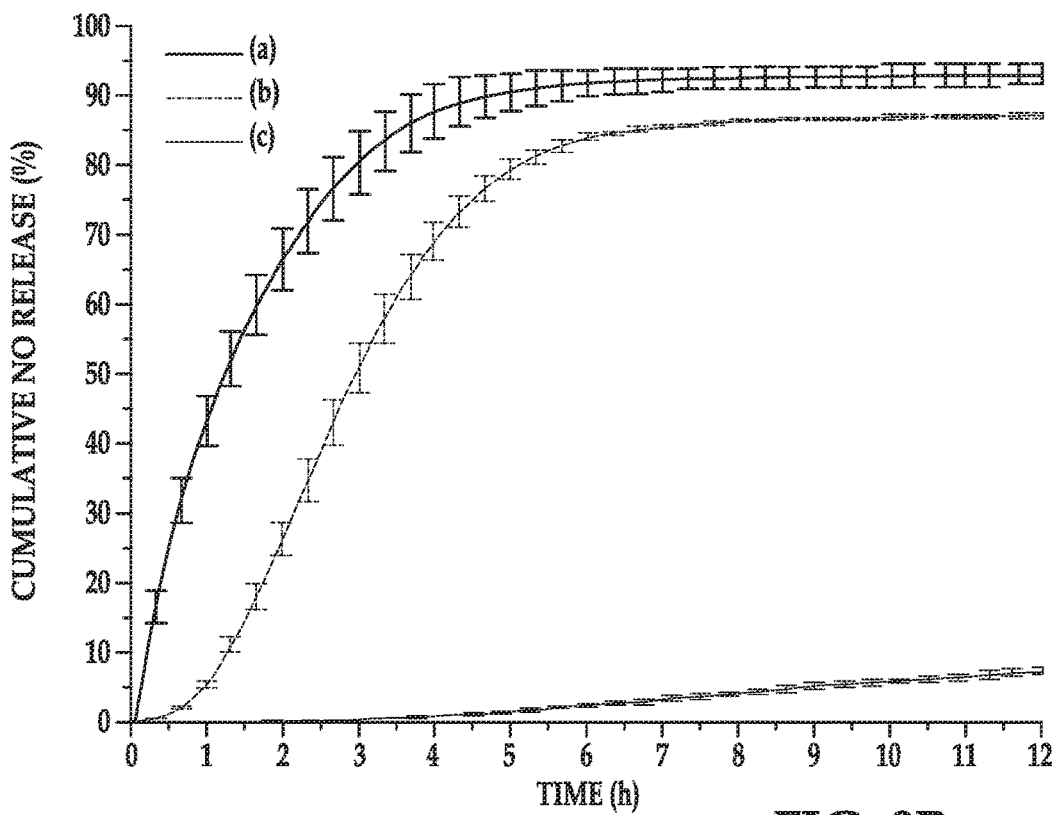
Figure 10A:
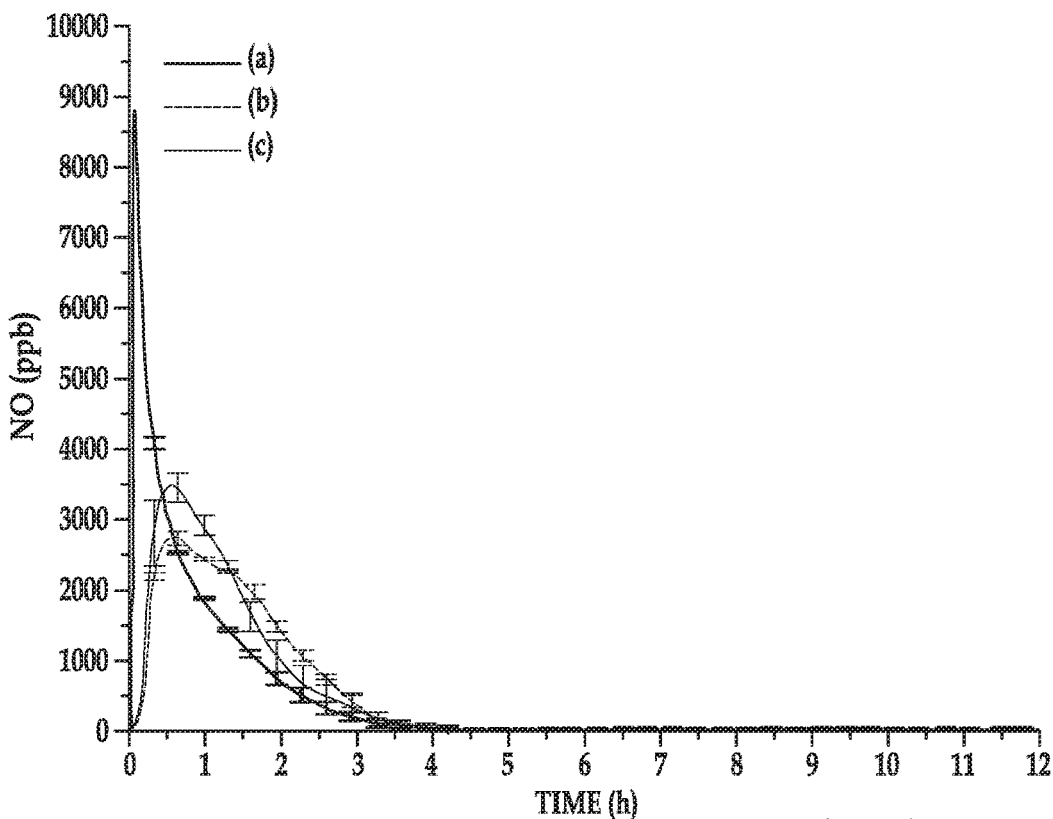
FIGS. 10A and 10B are graphs illustrating 10A) the kinetics of gas phase NO levels and 10B) the cumulative NO release from 3 mm diameter, 13 wt % polydimethylsiloxane (PDMS)-S-nitrosoglutathione (GSNO) doped films using (a) 385 nm, (b) 470 nm, and (c) 565 nm LED light sources (curves show the mean values and the error bars correspond to the standard error of the mean of three parallel measurements)
Figure 10B:
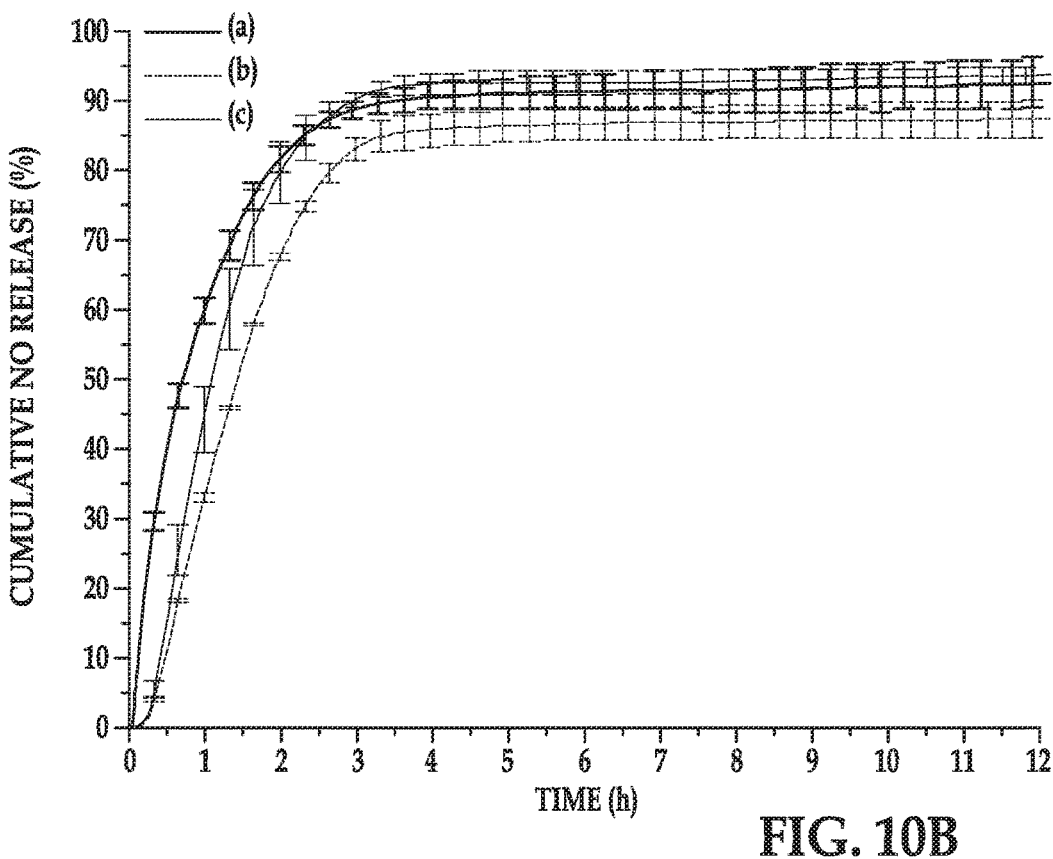

FIG. 9A shows the kinetics of gas phase NO levels and FIG. 9B shows the cumulative NO release for the PDMS-SNAP film when exposed to a) 385 nm, b) 470 nm, and c) 565 nm. FIG. 10A shows the kinetics of gas phase NO levels and FIG. 10B shows the cumulative NO release for the PDMS-GSNO film when exposed to a) 385 nm, b) 470 nm, and c) 565 m.

The curves in FIGS. 9A, 9B, 10A, and 10B show the mean values and the error bars correspond to the standard error of the mean of the three parallel measurements. The results in FIGS. 9A through 10B show that photolysis of SNAP and GSNO to generate NO gas may be accomplished with several different light sources. The results also indicate that the LED with the 385 nm nominal wavelength may be the most effective for both NO donors.

Example 2

The results in FIGS. 9A through 10B illustrate that when the PDMS-SNAP films and the PDMS-GSNO films are illuminated with a constant light power surface density, the NO emission from such films is not steady. As such, additional films were prepared and tested with a feedback system similar to that shown in FIG. 7.

In this example, S-nitroso-N-acetylpenicillamine (SNAP) was doped into polydimethylsiloxane (PDMS) films. These examples were representative of the NO cartridge 10" shown in FIG. 1C.

The SNAP crystals were blended with uncured silicone rubber, and the blends were cast into films and then cured. The SNAP crystal concentration in the films was 13 wt % and the films had 6 mm diameters.

LED light sources with nominal wavelengths of 385 nm, 470 nm, and 565 nm were used to expose the films to light in order to initiate photolysis and generate NO gas. The light power surface density was set to 51 $mW/cm^2$ for each light source. The sweep gas (recipient gas) was nitrogen at 200 SCCM flow rate. In this example, an amperometric NO sensor was used to continuously monitor the NO level in the delivered gas. The target NO level was 1000 ppb, and the light power surface density was adjusted if necessary based on the sensor feedback.

Figure 11A:
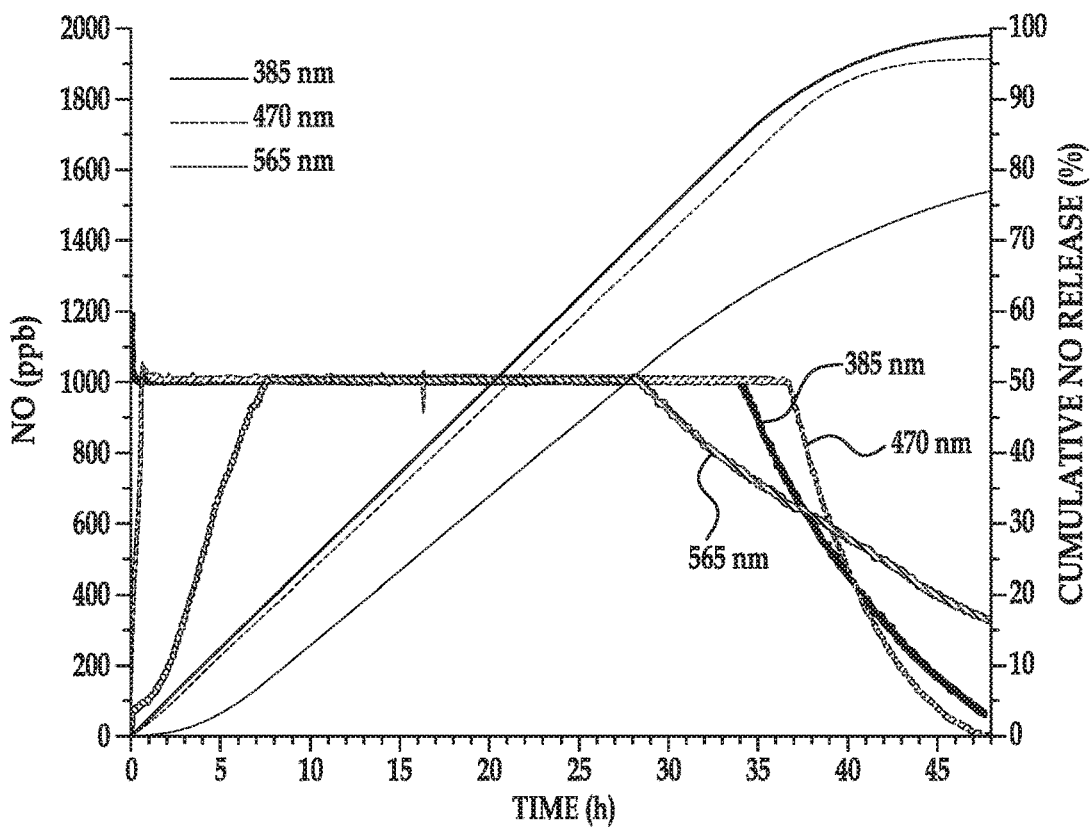
FIGS. 11A and 11B are graphs illustrating 11A) both the NO level in the delivered gas stream (thicker lines) and the cumulative NO release (skinny lines) and 11B) the PWM duty cycles for the pulse width modulated LED intensity during feedback controlled NO release from 6 mm diameter, PDMS-SNAP doped films with a target NO level of 1000 ppb using (a) 385 nm, (b) 470 nm, and (c) 565 nm LED light sources.
Figure 11B:
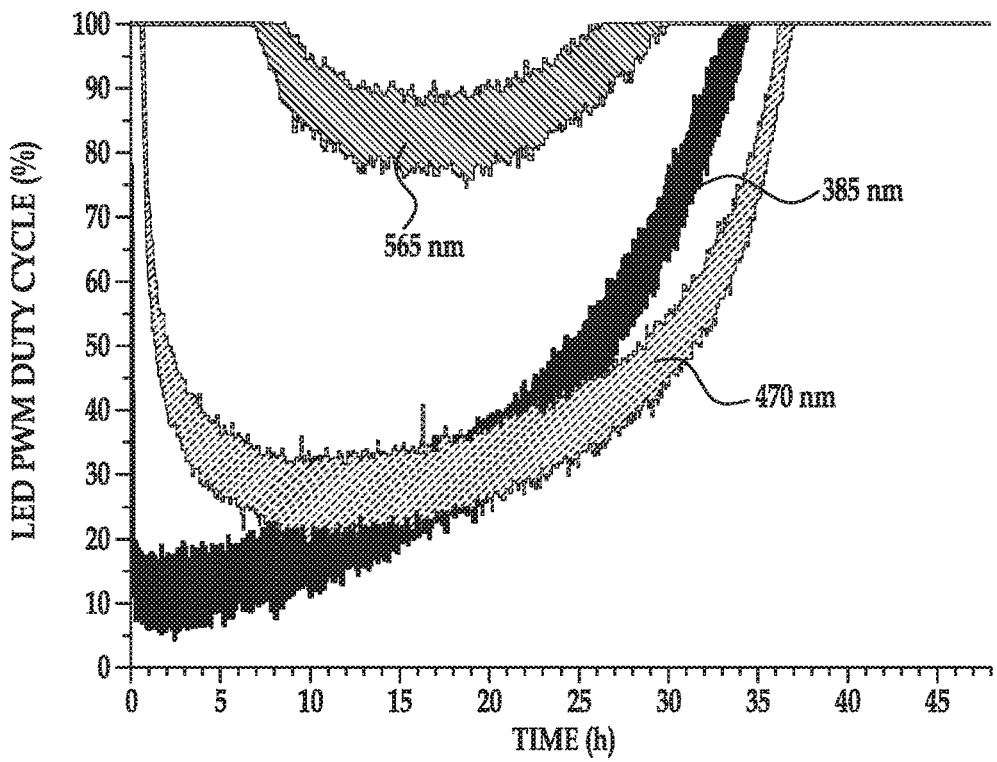

FIG. 11A shows the NO level in the delivered gas stream (thicker lines) and the cumulative NO release (skinny lines) for the PDMS-SNAP films exposed to 385 nm, 470 nm, and 565 nm. FIG. 11B shows the duty cycles for the pulse width modulation (PWM) of the 385 nm LED light source, the 470 nm LED light source, and the 565 nm LED light source.

Additional PDMS-SNAP films were tested with the target NO levels set to 1000 ppb, 2500 ppb, and 5000 ppb. For this test, the light source with the nominal wavelength of 385 nm was used, and the sweep gas (recipient gas) was nitrogen at 200 SCCM flow rate. The amperometric NO sensor was used to continuously monitor the NO level in the delivered gas, and the light power surface density was adjusted if necessary based on the sensor feedback.

Figure 12A:
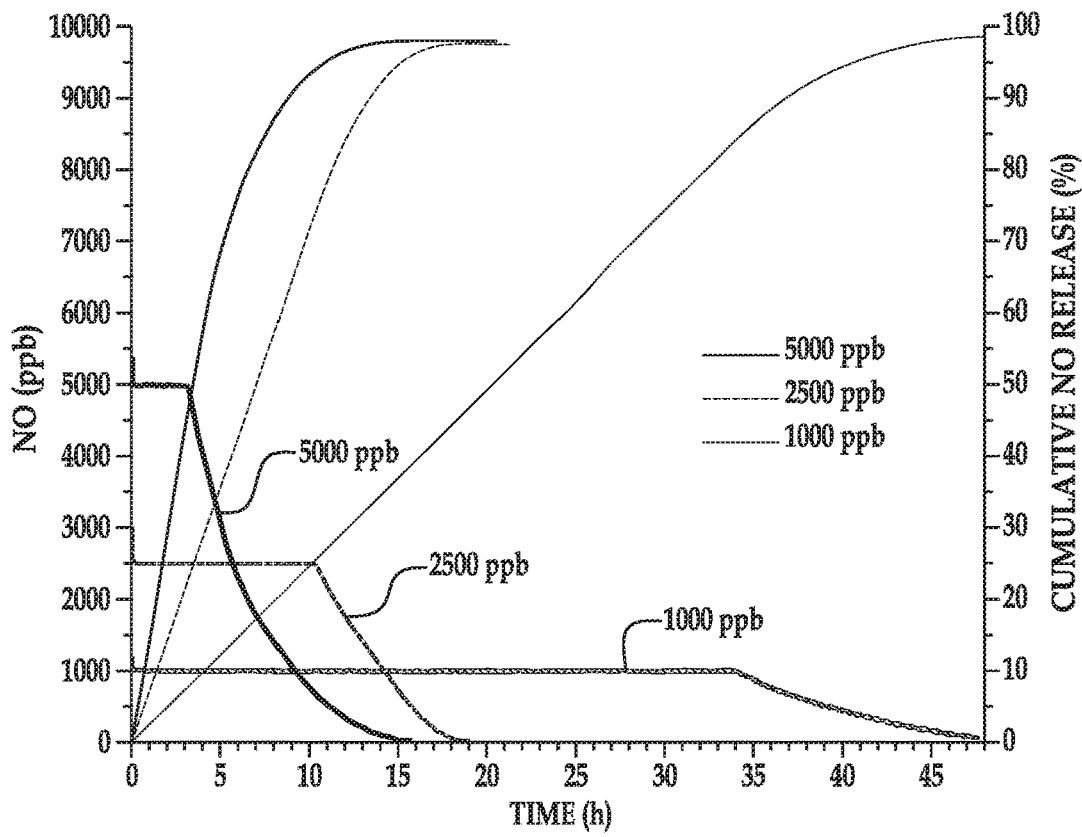
FIGS. 12A and 12B are graphs illustrating 12A) both the NO level in the delivered gas stream (thicker lines) and the cumulative NO release (skinny lines) and 12B) the PWM duty cycles for the pulse width modulated LED intensity during feedback controlled NO release from 6 mm diameter, PDMS-SNAP doped films with target NO levels of 1000 ppb, 2500 ppb, and 5000 ppb using a 385 nm LED light source.
Figure 12B:
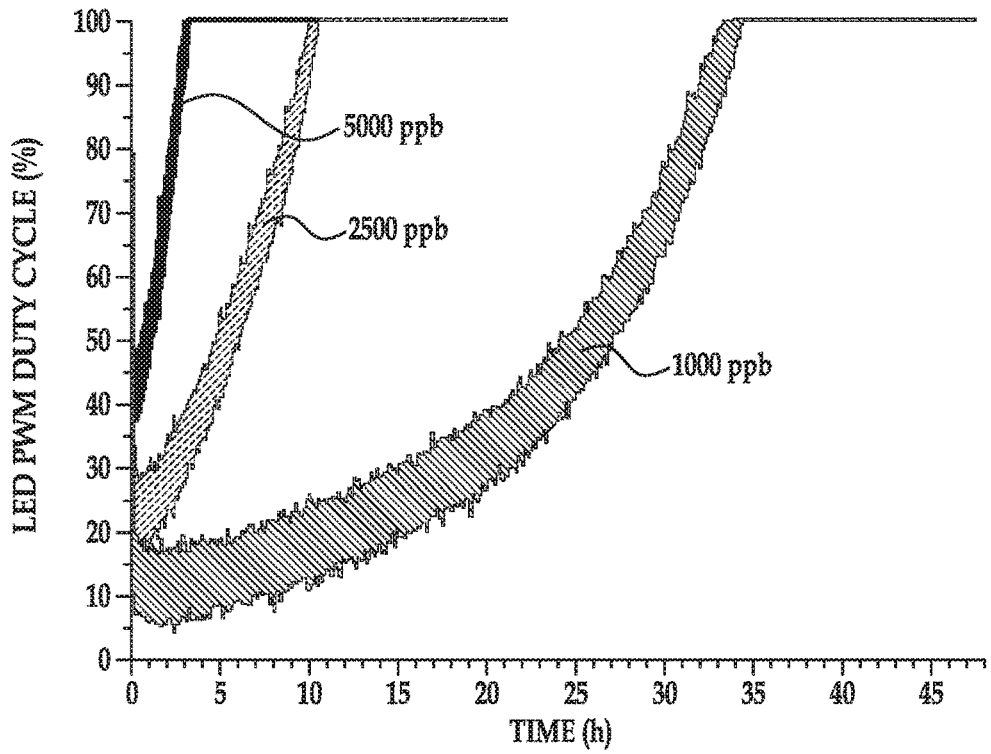

FIG. 12A shows the NO level in the delivered gas stream (thicker lines) and the cumulative NO release (skinny lines) for the PDMS-SNAP films exposed to 385 nm. FIG. 12B shows the duty cycles for the pulse width modulation of the 385 nm LED light source at the various target NO levels.

These results show that relatively consistent and steady NO emission may be achieved using the feedback system disclosed herein.

Still other PDMS-SNAP films were tested with the target NO levels changed stepwise to 500 ppb, 1000 ppb, 1500 ppb, 2000 ppb, 2500 ppb, and 5000 ppb and then back in the reverse direction. For this test, the light source with the nominal wavelength of 385 nm was used, and the sweep gas (recipient gas) was nitrogen at 200 SCCM flow rate. The amperometric NO sensor was used to continuously monitor the NO level in the delivered gas, and the light power surface density was adjusted if necessary based on the sensor feedback.

Figure 13A:
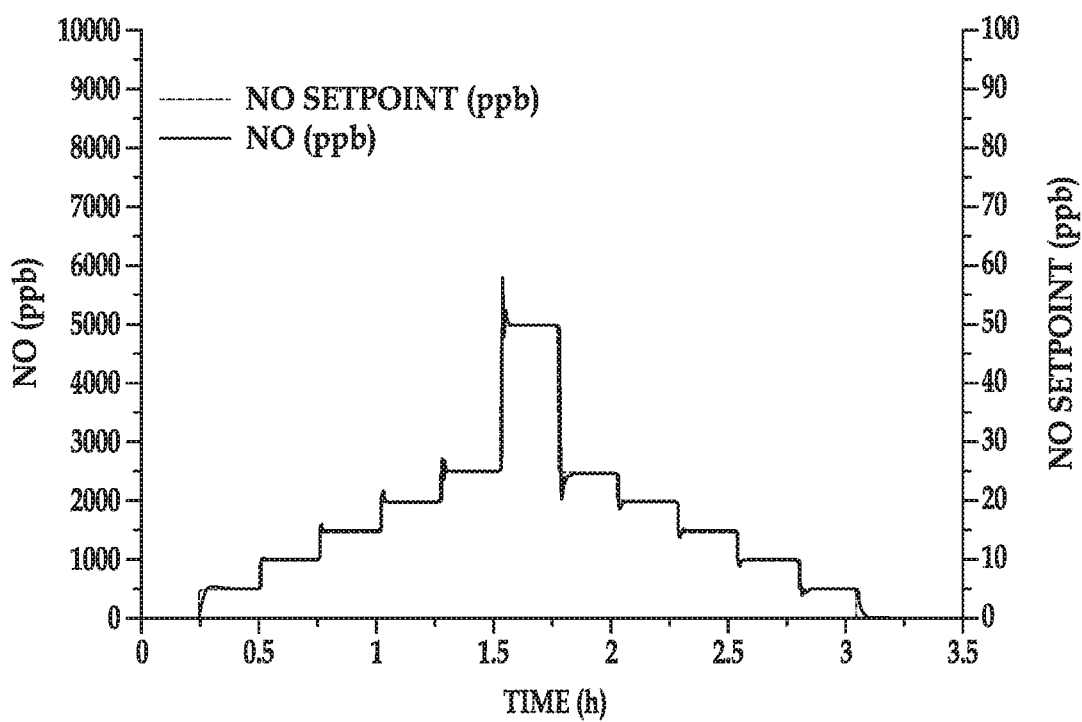
FIGS. 13A and 13B are graphs illustrating 13A) the NO level in the delivered gas stream and 13B) the PWM duty cycles for the pulse width modulated LED intensity during feedback controlled NO release from 6 mm diameter, PDMS-SNAP doped films with target NO levels changed stepwise to 500 ppb, 1000 ppb, 1500 ppb, 2000 ppb, 2500 ppb, and 5000 ppb and then back in the reverse direction using a 385 nm LED light source.
Figure 13B:
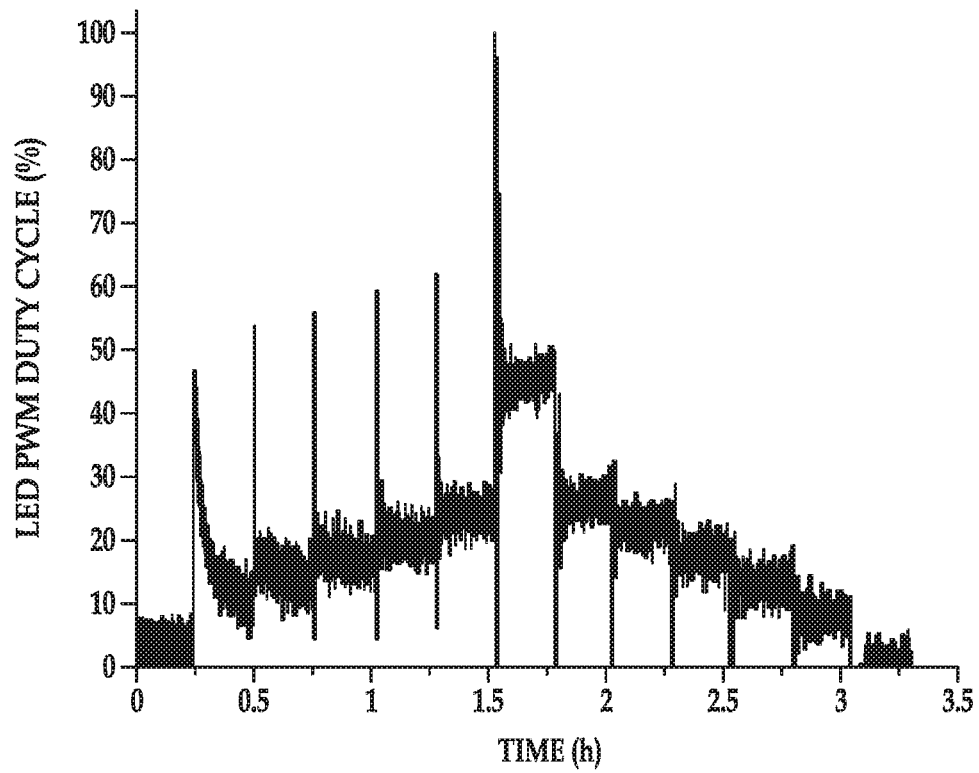

FIG. 13A shows the NO setpoint and the actual NO level measured for the PDMS-SNAP films exposed to 385 nm. FIG. 13B shows the duty cycles for the pulse width modulation of the 385 nm LED light source at the various target NO levels.

Still other PDMS-SNAP films were tested with the target NO level set to 2500 ppb. For this test, the light source with the nominal wavelength of 385 nm was used, and the sweep gas (recipient gas) was nitrogen at varying flow rates. The amperometric NO sensor was used to continuously monitor the NO level in the delivered gas, and the light power surface density was adjusted if necessary based on the sensor feedback.

Figure 14:
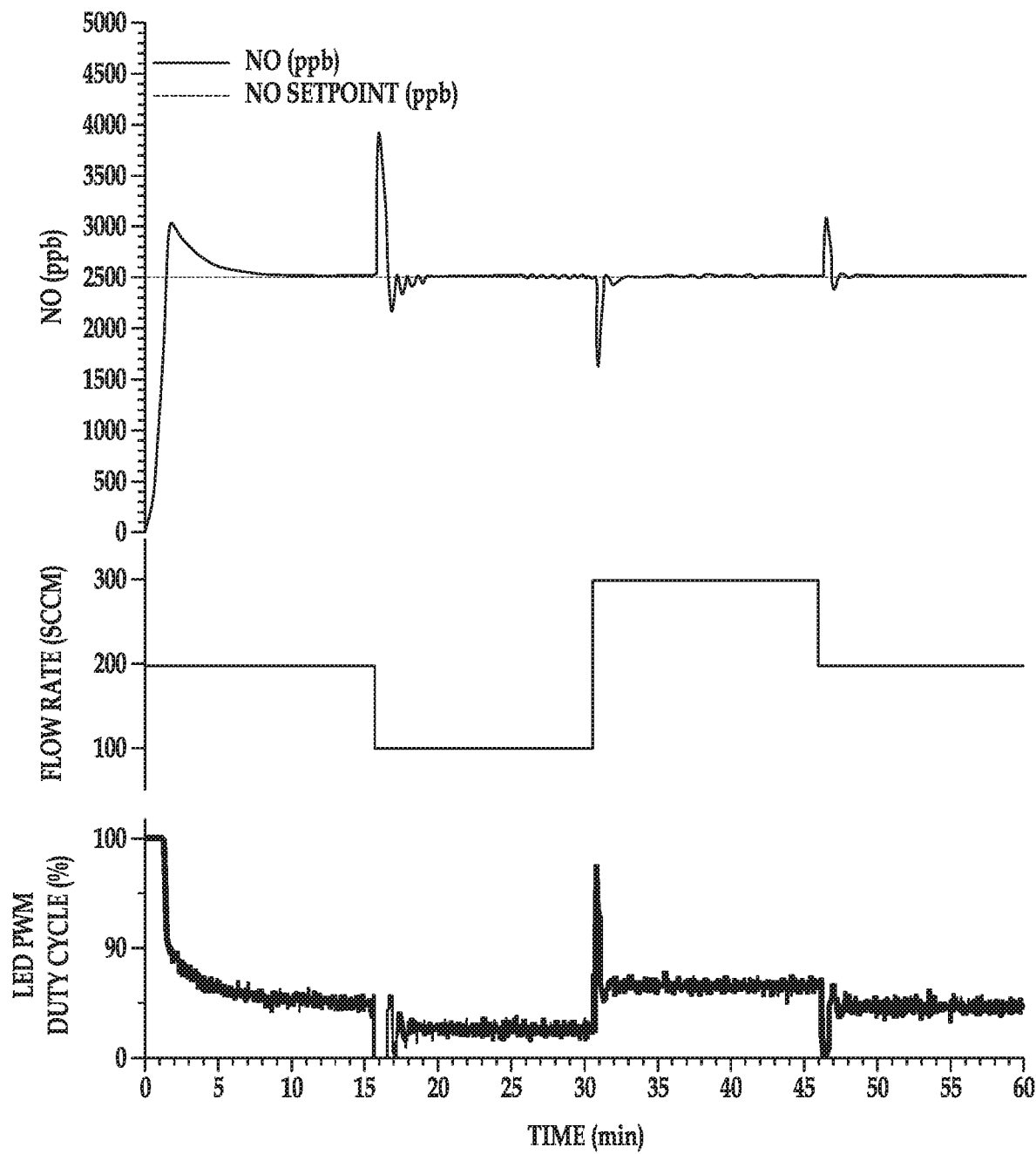
FIG. 14 is a graph illustrating system response to perturbation of the flow rate of nitrogen recipient gas, where the top graph illustrates the NO level in the delivered gas stream, the middle graph illustrates changes in the nitrogen flow rate, and bottom graph illustrates the PWM duty cycles for the pulse width modulated LED intensity during feedback controlled NO release from 6 mm diameter, PDMS-SNAP doped films with a target NO level of 2500 ppb using a 385 nm LED light source.

FIG. 14 shows the system response to the perturbation of the flow rate of the nitrogen gas. The nitrogen gas flow rate changes are shown in the center, the effect on NO release is shown at the top, and the effect on the duty cycles for the pulse width modulation of the 385 nm LED light source is shown at the bottom.

Example 3

PDMS-SNAP films were tested with nitrogen gas and air to determine when nitrogen dioxide was generated.

In this example, S-nitroso-N-acetylpenicillamine (SNAP) was doped into polydimethylsiloxane (PDMS) films. These examples were representative of the NO cartridge 10" shown in FIG. 1C.

The SNAP crystals were blended with uncured silicone rubber, and the blends were cast into films and then cured. The SNAP crystal concentration in the films was 13 wt % and the films had 6 mm diameters.

The LED light source with a nominal wavelength of 385 nm was used to expose the films to light in order to initiate photolysis and generate NO gas. The light power surface density was set to 51 mW/cm$^2$. For some tests, the sweep gas (recipient gas) was nitrogen at 200 SCCM flow rate. For other tests, the sweep gas (recipient gas) was air at 200 SCCM flow rate. In this example, amperometric NO sensors were used to continuously monitor the NO level in the delivered gases. The target NO level was 1000 ppb, and the light power surface density was adjusted if necessary based on the sensor feedback.

Figure 15A:
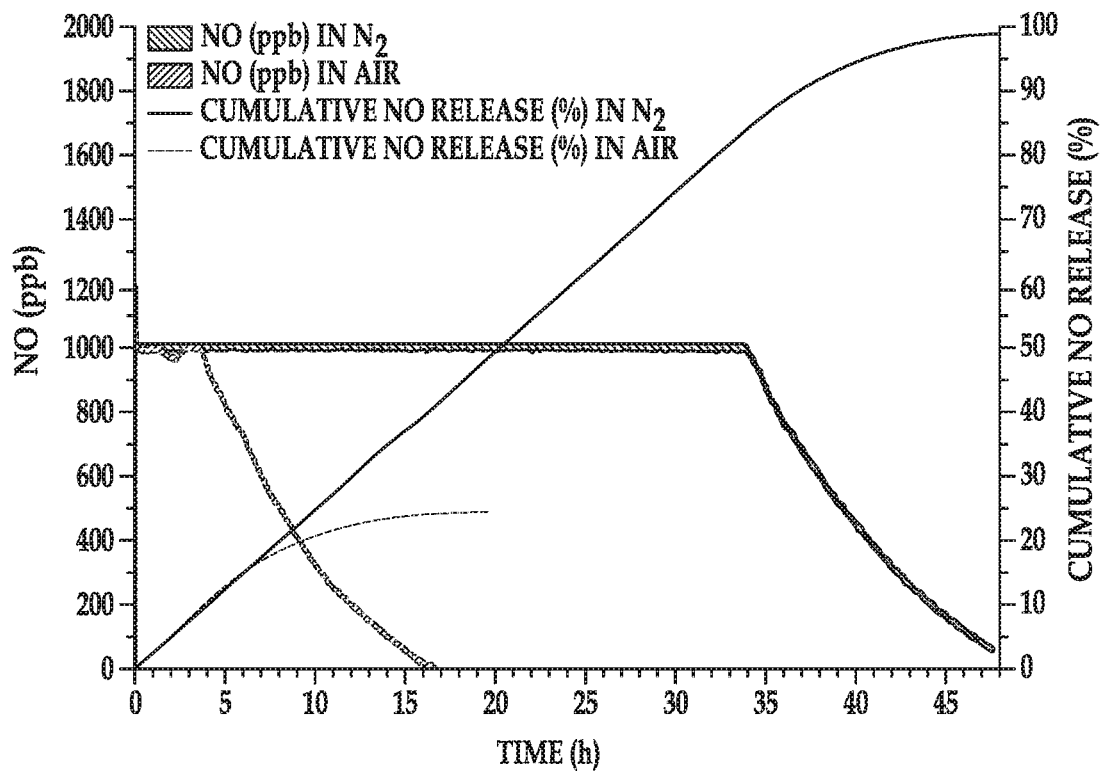
FIGS. 15A and 15B are graphs illustrating 15A) both the NO level in the delivered gas stream (thicker lines) and the cumulative NO release (skinny lines) and 15B) the PWM duty cycles for the pulse width modulated LED intensity during feedback controlled NO release from 6 mm diameter, PDMS-SNAP doped films with a target NO level of 1000 ppb using a 385 nm LED light source and different recipient gases, namely nitrogen gas ($N_2$) or air.
Figure 15B:
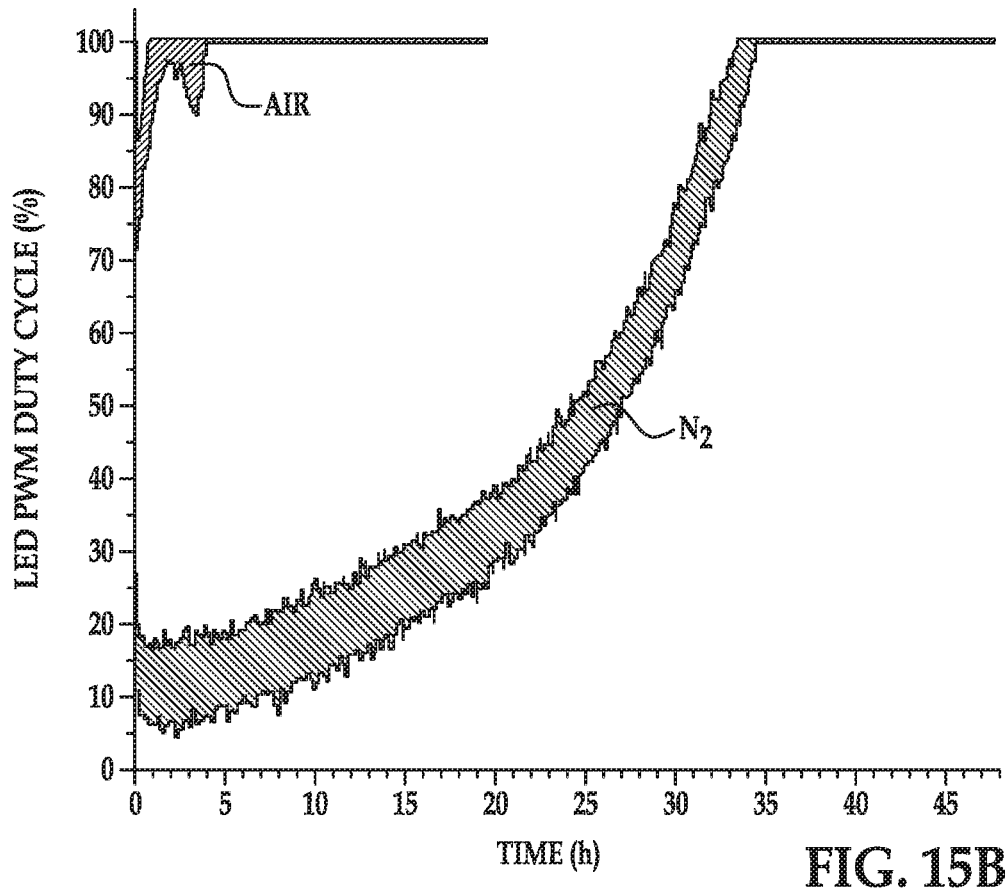

FIG. 15A shows the NO level in the delivered $N_2$ or air gas streams (thicker lines) and the cumulative NO release (skinny lines) for the PDMS-SNAP films exposed to 385 nm. FIG. 15B shows the duty cycles for the pulse width modulation of the 385 nm LED light source when used with the $N_2$ gas stream or the air gas stream.

The results in FIGS. 15A and 15B indicate that nitrogen dioxide is forming when the air gas stream is used. The $NO_2$ formation may take place in the PDMS film, as it is highly soluble of both oxygen and NO. As such, an $NO_2$ filter or a vacuum chamber may be used with the NO donor doped films disclosed herein.

Example 4

Based on the results in Example 3, the following test was performed. In this example, S-nitroso-N-acetylpenicillamine (SNAP) was doped into polydimethylsiloxane (PDMS) films. These examples were representative of the NO cartridge 10" shown in FIG. 1C.

The SNAP crystals were blended with uncured silicone rubber, and the blends were cast into films and then cured. The SNAP crystal concentration in the films was 31.1 mg and the films had 6 mm diameters.

The LED light source with a nominal wavelength of 385 nm was used to expose the films to light in order to initiate photolysis and generate NO gas. The light power surface density was set to 51 mW/cm$^2$. For this test, the sweep gas (recipient gas) was nitrogen at 40 SCCM flow rate. Once mixed with the NO, the sweep gas was mixed with oxygen gas (160 SCCM flow rate) in order to deliver 2500 ppb NO gas in 80% $O_2$ stream. The NO concentration was measured after mixing the two gas streams.

Figure 16A:
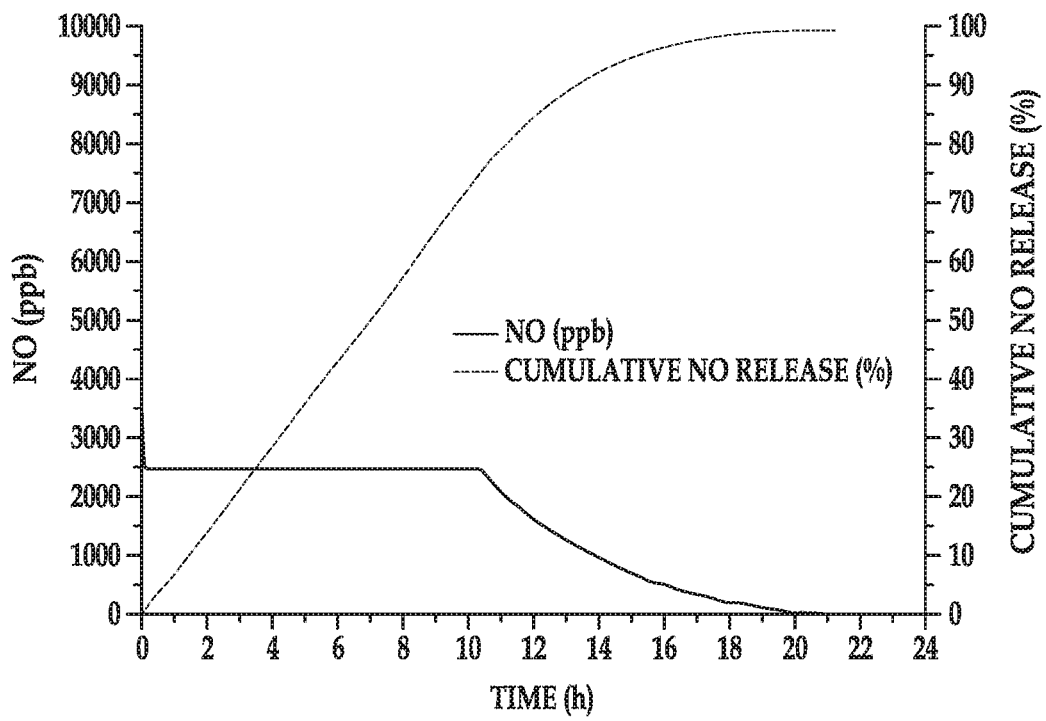
FIGS. 16A and 16B are graphs illustrating 16A) both the NO level in the delivered gas stream and the cumulative NO release and 16B) the PWM duty cycle for the pulse width modulated LED intensity during feedback controlled NO release from 6 mm diameter, PDMS-SNAP doped films with a target NO level of 2500 ppb using a 385 nm LED light source and a nitrogen recipient gas stream that was subsequently mixed with oxygen in order to deliver the generated NO gas in an 80% $O_2$ stream (NO concentration was measured after gas mixing)
Figure 16B:
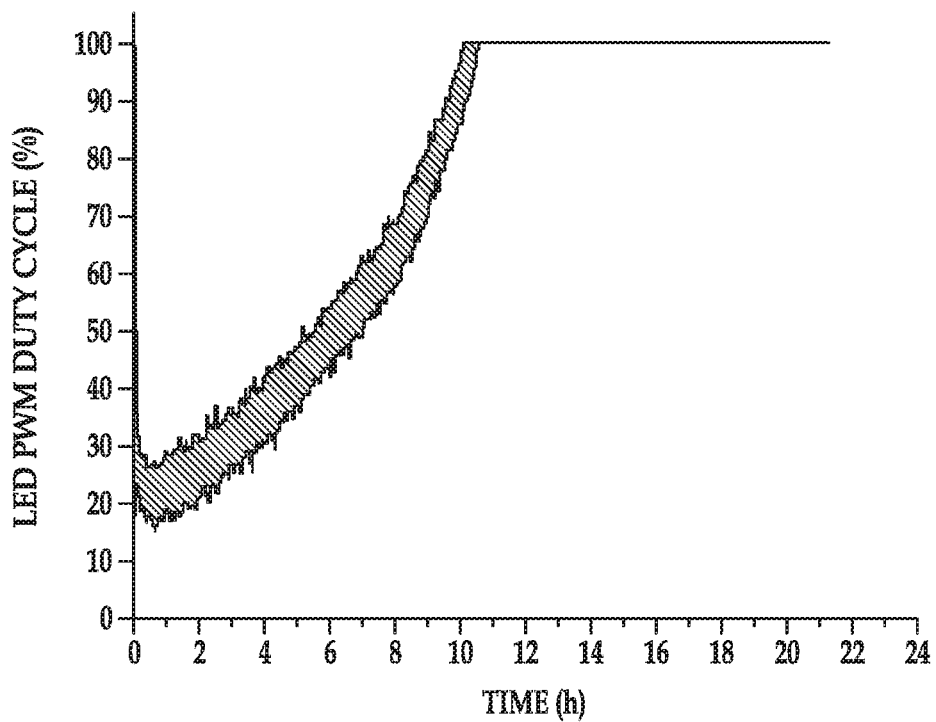

FIG. 16A shows the NO level in the combined stream (solid line) and the cumulative NO release (dashed lines) for the PDMS-SNAP films exposed to 385 nm. FIG. 16B shows the duty cycles for the pulse width modulation of the 385 nm LED light source when used with the combined stream.

The results in FIGS. 16A and 16B indicate that nitrogen is a suitable sweep gas and that the addition of oxygen subsequently helps to reduce the $NO_2$ formation.

Example 5

Based on the results in Example 3, the following test was performed. In this example, solid S-nitrosoglutathione (GSNO) was doped into polydimethylsiloxane (PDMS) films. These examples were representative of the NO cartridge 10" shown in FIG. 1C.

The solid GSNO was blended with uncured silicone rubber, and the blends were cast into films and then cured. The solid GSNO concentration in the films was 13 wt % and the films had 6 mm diameters.

The LED light source with a nominal wavelength of 470 nm was used to expose the films to light in order to initiate photolysis and generate NO gas. The light power surface density was set to 51 mW/cm$^2$. For this test, the sweep gas (recipient gas) was nitrogen at 200 SCCM flow rate or air at 200 SCCM flow rate. One nitrogen stream was tested as is, another nitrogen stream was tested after being passed through a conditioned silica gel NO$_2$ scrubber, and the air stream was tested after being passed through a conditioned silica gel NO$_2$ scrubber.

Figure 17A:
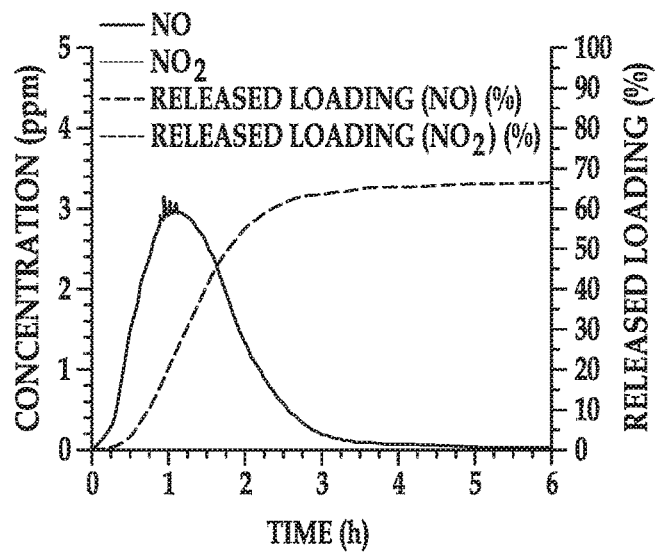
FIGS. 17A, 17B and 17C are graphs depicting NO and $NO_2$ release from PDMS-GSNO doped films 17A) in nitrogen, 17B) in nitrogen with a conditioned silica gel $NO_2$ scrubber, and 17C) in air with a conditioned silica gel $NO_2$ scrubber.
Figure 17B:
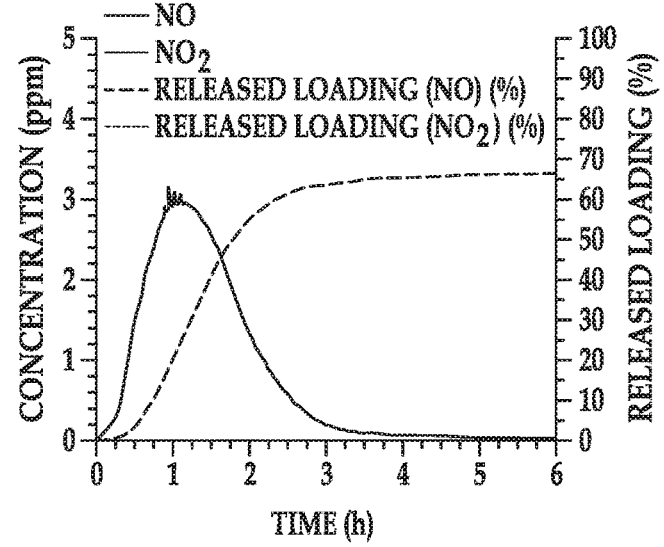
Figure 17C:
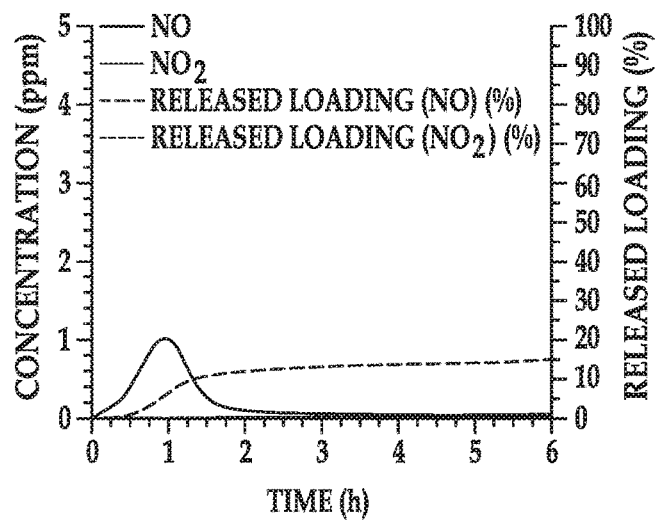
Figure 18A:
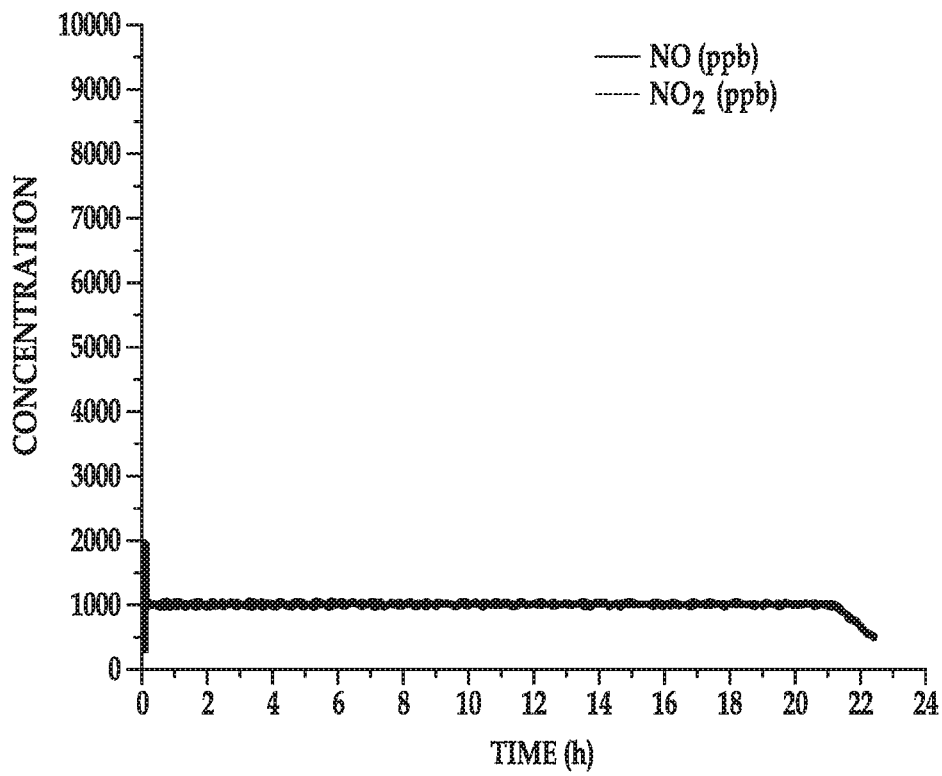
FIGS. 18A through 18D are graphs depicting NO and $NO_2$ release from an NO inhalation device at 4 L/min air flow rate using a microporous GSNO cartridge (e.g., as shown in FIG. 1A)
Figure 18B:
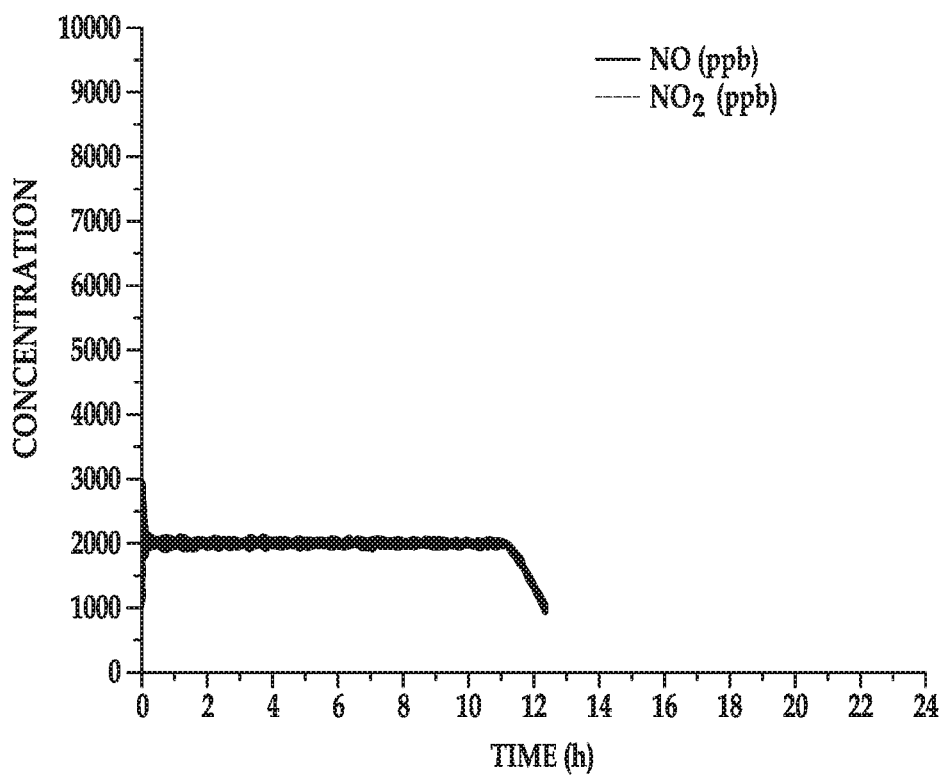
Figure 18C:
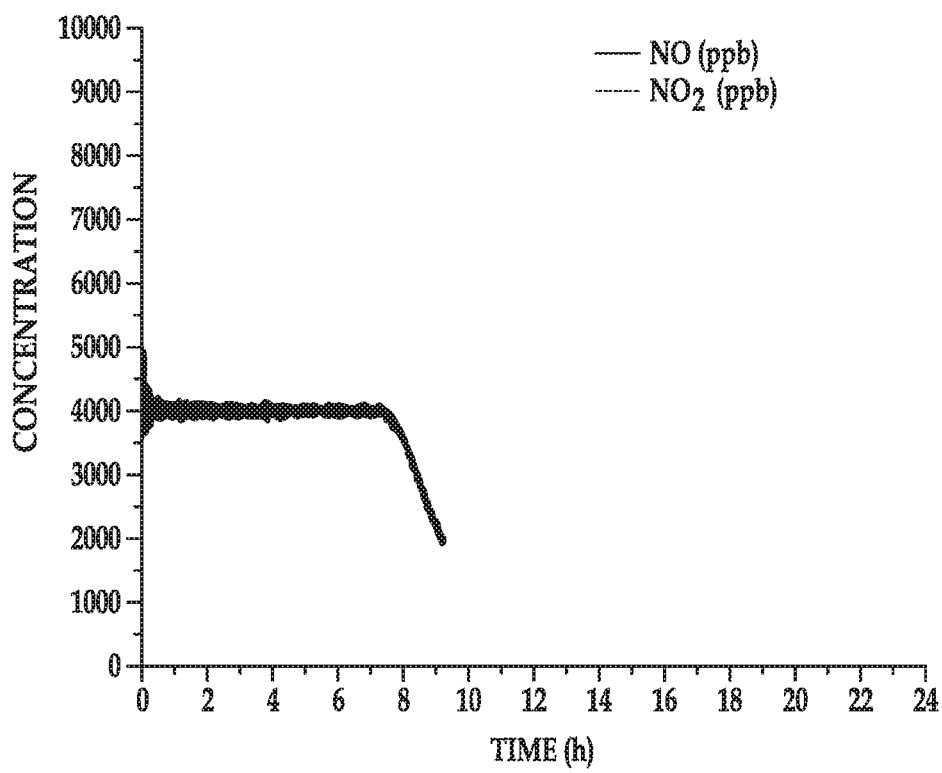
Figure 18D:
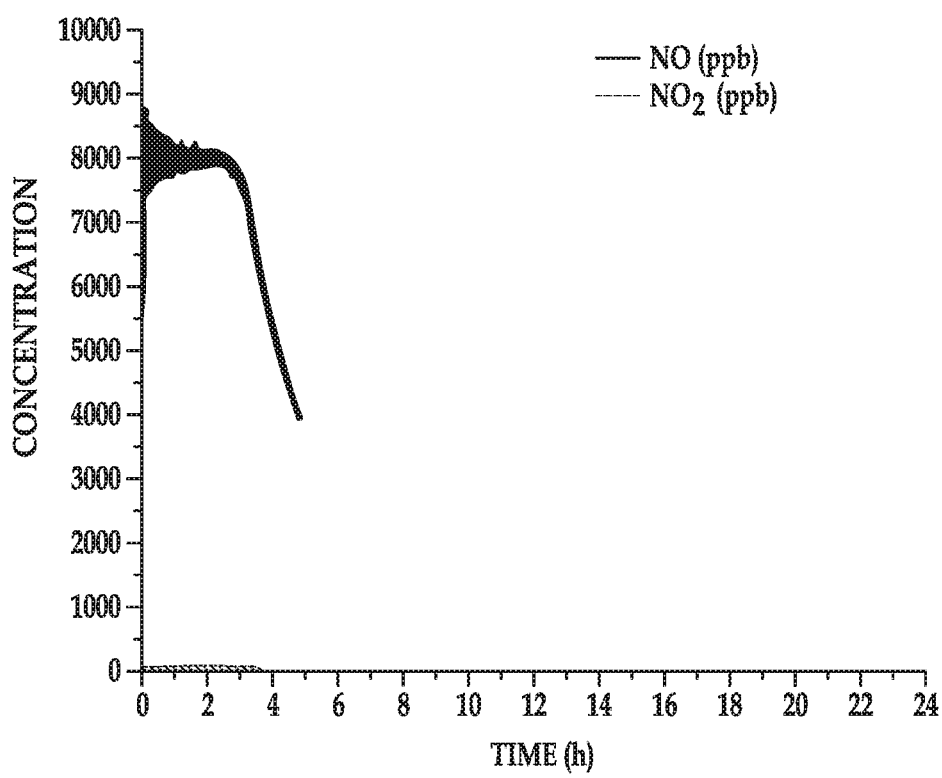

FIG. 17A shows the NO and NO$_2$ levels in the nitrogen stream, FIG. 17B shows the NO and NO$_2$ levels in the nitrogen stream after being passed through a conditioned silica gel NO$_2$ scrubber, and FIG. 17C shows the NO and NO$_2$ levels in the air stream after being passed through a conditioned silica gel NO$_2$ scrubber. The NO$_2$ scrubber did not change the available NO yield from the film, but it did remove the NO$_2$ generated in the presence of oxygen. The released loadings were close to zero in all of these tests, and thus are not visible in FIGS. 17A-17C.

Example 6

An adhesive (crystal clear GORILLA® tape) was applied on opposed surfaces of a substrate, and S-nitrosoglutathione (GSNO) solids were spread onto the adhesive on both surfaces. Track etch polycarbonate films were placed over the solids and adhered to the substrate surfaces. This example was representative of the NO cartridge 10 shown in FIGS. 1A and 2.

LED light sources with a nominal wavelength of 470 nm was used to expose the NO donors to light in order to initiate photolysis and generate NO gas that permeated through the polycarbonate membranes. The light power surface density was set to 51 mW/cm$^2$ for each light source. For this test, the sweep gas (recipient gas) was air at 4 L/min flow rate. Both NO and NO$_2$ levels were measured in the delivered gas. The tests were performed at target NO levels of 1000 ppb, 2000 ppb, 4000 ppb and 8000 ppb, and the light intensity was controlled based on the sensor feedback.

FIGS. 18A through 18D show the NO and NO$_2$ levels in the air stream at the various target levels. The NO levels are on track with the target levels, and the NO$_2$ levels were minimal (FIG. 18D) if present at all.

Example 7

A system including four NO cartridges was generated.

For each NO cartridge, a different patterned adhesive was generated to include cavities. For each patterned adhesive, 6.25 mm$^2$ area hexagon shaped cavities were cut into a 200 μm thick and 47 mm diameter circular piece of 3M™ Optically Clear Adhesive using a cutting plotter. The geometry of the patterned adhesive and the individual cavities was similar to that shown in FIG. 1F. One of the liners was removed from each of the patterned adhesives, and two of the patterned adhesives were adhered to one glass substrate and the other two of the patterned adhesives were adhered to another glass substrate. 280 mg of SNAP was screen printed into the cavities of each of the patterned adhesives. The other of the liners was removed from each of the patterned adhesives, and a track etch polycarbonate film/membrane was placed over and adhered to each of the patterned adhesives.

Figure 20A:
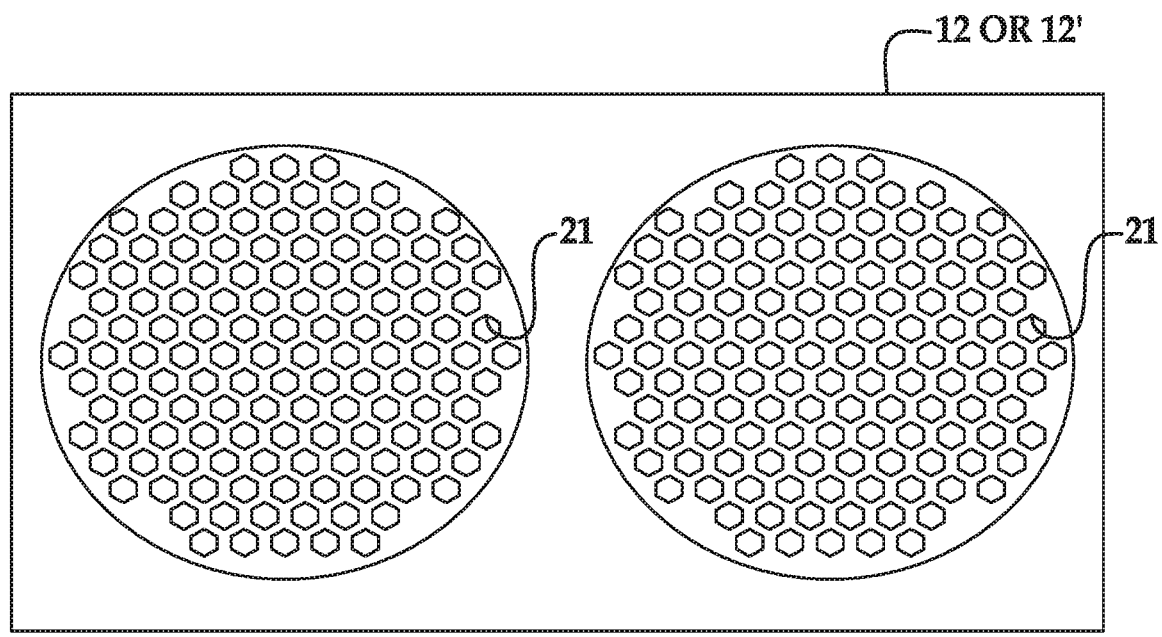
FIG. 20A is a top, schematic view of the system used to generate the data shown in FIG. 19.
Figure 20B:
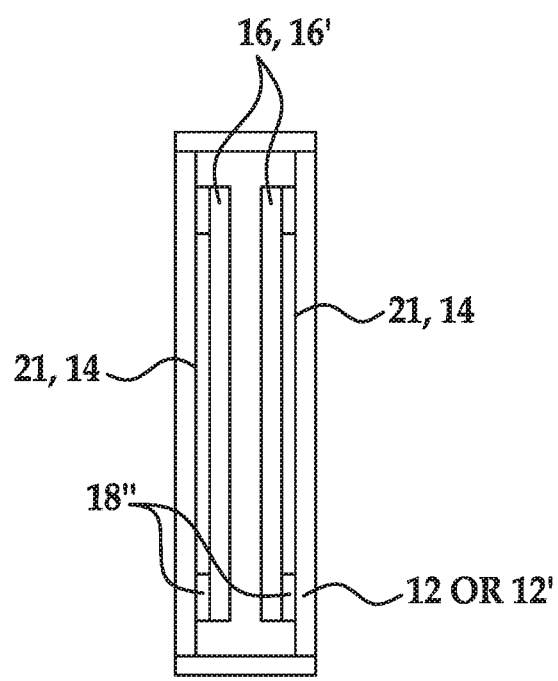
FIG. 20B is a schematic cross-sectional view (take along a line from the top of the system to the bottom of the system) of one example of the system shown in FIG. 20A.

To form the system, the glass substrates (each of which included two of the NO cartridges) were sealed together at the top and bottom so that the membranes (16 or 16') of each cartridge were facing each other and so that air could flow between the membranes. The top view of the system is schematically shown in FIG. 20A (illustrating two of the NO cartridges), and a cross-sectional view of the system taken along a line from the top of the system (as shown in FIG. 20A) to the bottom of the system is shown in FIG. 20B. In FIG. 20B, it is to be understood that the portion of the cross-section labeled with the cavities 21 and NO donor 14 is shown schematically and that the view may actually include several individual cavities and the NO donor positioned therein.

Figure 20C:
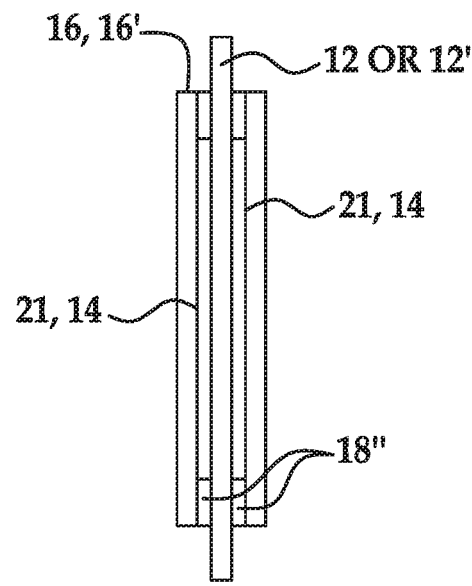
FIG. 20C is a schematic cross-sectional view (take along a line from the top of the system to the bottom of the system) of another example of the system shown in FIG. 20A.

While not used in this particular example, FIG. 20C illustrates another example of the system including several NO cartridges. In this example, one glass substrate (12 or 12') is used, and the patterned adhesives are adhered to opposed sides of the glass substrate. The cavities of each patterned adhesive is filled with the NO donor and the membrane (16 or 16') is positioned over the patterned adhesive having the NO donor located within its cavities).

For this example, an LED light source with a nominal wavelength of 470 nm was used to expose the NO donor in the cavities to light in order to initiate photolysis and generate NO gas that permeated through the polycarbonate membranes. For this test, the sweep gas (recipient gas) was air at 4 L/min flow rate. Both NO and NO$_2$ levels were measured in the delivered gas using amperometric gas sensors (data labeled iNO$_2$ in FIG. 19). The light power was feedback controlled based on the signal amperometric NO gas sensor and the target NO level as a reference signal. The NO and NO$_2$ levels of the output gas stream were validated with ozone chemiluminescent NO and NOx analyzers (data labeled NOA in FIG. 19).

Figure 19:
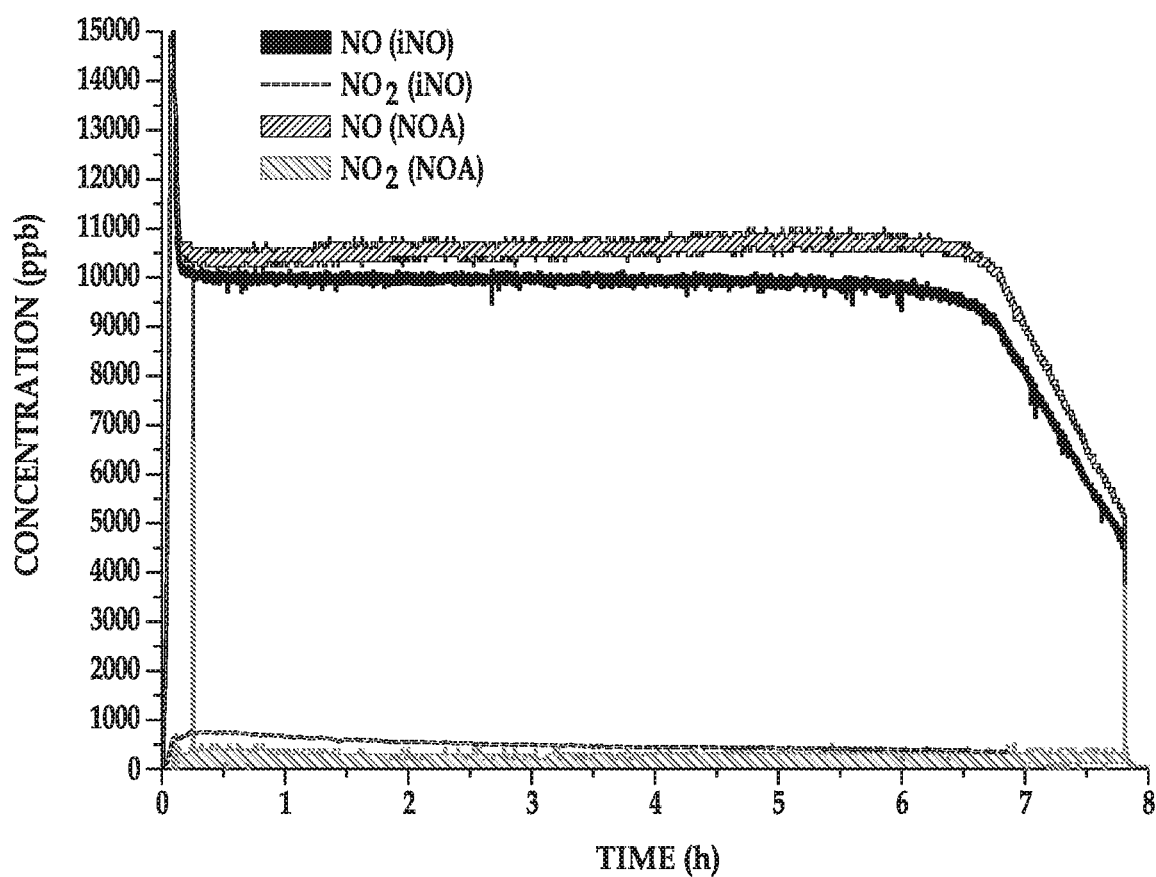
FIG. 19 is a graph depicting the NO and $NO_2$ concentration (ppb) over time (h, hours) for a system including four NO cartridges, each of which included a patterned adhesive piece and SNAP in the cavities of the patterned adhesive piece.

FIG. 19 shows the NO and NO$_2$ levels in the air streams. The NO levels are on track with the target levels, and the NO$_2$ levels were minimal, if present at all. These results show that for low-dose NO (10 ppm) delivery, the nitric oxide cartridge shown in FIG. 1D and FIG. 1E can be used without an NO$_2$ scrubber.

It is to be understood that the ranges provided herein include the stated range and any value or sub-range within the stated range, as if the value(s) or sub-range(s) within the stated range were explicitly recited. For example, a range from about 300 nm to about 600 nm should be interpreted to include not only the explicitly recited limits of from about 300 nm to about 600 nm, but also to include individual values, such as about 375 nm, about 520.5 nm, 450 nm, 599 nm, etc., and sub-ranges, such as from about 395 nm to about 595 nm, etc. Furthermore, when "about" is utilized to describe a value, this is meant to encompass minor variations (up to +/− 10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A gas delivery device, comprising:
a nitric oxide (NO) generating system, including:
   a chamber having interior and exterior surfaces;
   an NO cartridge contained within the chamber, the NO cartridge including:
      a substrate;
      a solid, light sensitive NO donor immobilized on a surface of the substrate; and
      an NO permeable and light transparent membrane positioned on the solid, light sensitive NO donor; and
   a light source attached to either i) the exterior surface or ii) the interior surface and spaced from the NO cartridge, wherein the light source is operatively positioned on the exterior or interior surface to selectively expose the solid, light sensitive NO donor to light to generate NO gas;
   an inspiratory gas conduit operatively connected to the chamber to introduce an oxygen-containing gas and form an output gas including the NO gas; and
   an outlet conduit to transport a stream of the output gas from the NO generating system.

2. The gas delivery device as defined in claim 1 wherein the NO permeable and light transparent membrane is a nanoporous membrane or a microporous membrane including polycarbonate.

3. The gas delivery device as defined in claim 1 wherein the solid, light sensitive NO donor is a light sensitive S-nitrosothiol.

4. The gas delivery device as defined in claim 3 wherein the light sensitive S-nitrosothiol is selected from the group consisting of S-nitroso-N-acetyl-penicillamine crystals, S-nitrosoglutathione crystals, and combinations thereof.

5. The gas delivery device as defined in claim 1 wherein the solid, light sensitive NO donor is immobilized on the substrate by a pressure sensitive adhesive.

6. The gas delivery device as defined in claim 1, further comprising:
   a sensor in contact with the output gas stream to monitor a nitric oxide level of the output gas stream; and
   a controller operatively connected to the sensor and to the light source, the controller to adjust a parameter of the light source in response to the nitric oxide level from the sensor.

7. The gas delivery device as defined in claim 1, further comprising:
   a delivery conduit operatively connected to the outlet conduit; and
   an inhalation unit operatively connected to a delivery conduit and selected from the group consisting of a ventilator, a face mask, and a nasal cannula.

8. The gas delivery device as defined in claim 7, further comprising a nitrogen dioxide filter positioned in the delivery conduit to receive the output gas stream before it is delivered to the inhalation unit.

9. The gas delivery device as defined in claim 1 wherein the light from the light source is to initiate photolysis of the solid, light sensitive NO donor.

10. The gas delivery device as defined in claim 9 wherein the light source has a nominal wavelength ranging from about 300 nm to about 600 nm.

11. The gas delivery device as defined in claim 1 wherein an $NO_2$ level in the output gas is less than 1 parts per million by volume (ppmv).

12. The gas delivery device as defined in claim 1 wherein the solid, light sensitive NO donor is immobilized in a cavity formed on the substrate.

13. A gas delivery device, comprising:
a nitric oxide (NO) generating system, including:
   a NO cartridge contained within the chamber, the NO cartridge including:
      a substrate having first and second surfaces;
      a solid, light sensitive NO donor immobilized on a surface of the substrate; and
      an NO permeable and light transparent membrane positioned on the solid, light sensitive NO donor; and
   a light source operatively positioned to selectively expose the solid, light sensitive NO donor to light to generate NO gas;
   an inspiratory gas conduit operatively connected to the chamber to introduce an oxygen-containing gas and form an output gas including the NO gas; and
   an outlet conduit to transport a stream of the output gas from the NO generating system,
wherein:
   the solid, light sensitive NO donor and the NO permeable and light transparent membrane are positioned on the first surface of the substrate;
   the NO cartridge further includes:
      a second solid, light sensitive NO donor immobilized on the second surface of the substrate; and
      a second NO permeable and light transparent membrane positioned on the second solid, light sensitive NO donor; and
   the NO generating system further includes a second light source operatively positioned to selectively expose the second solid, light sensitive NO donor to light to generate additional NO gas.

14. A gas delivery device, comprising:
a nitric oxide (NO) generating system, including:
   a chamber having interior and exterior surfaces;
   an NO cartridge contained within the chamber, the NO cartridge including:
      a light transparent substrate;
      a solid, light sensitive NO donor immobilized on a surface of the light transparent substrate;
      a light transparent adhesive sandwiched between the light transparent substrate and the solid, light sensitive NO donor; and
      a porous membrane positioned on the solid, light sensitive NO donor; and
   a light source attached to either i) the exterior surface or ii) the interior surface and spaced from the NO cartridge, wherein the light source is operatively positioned on the exterior or interior surface to selectively expose the solid, light sensitive NO donor to light through the light transparent substrate to generate NO gas;
   an inspiratory gas conduit operatively connected to the chamber to introduce an oxygen-containing gas and form an output gas including the NO gas; and
   an outlet conduit to transport a stream of the output gas from the NO generating system.

15. The gas delivery device as defined in claim 14 wherein an $NO_2$ level in the output gas is less than 1 parts per million by volume (ppmv).

16. A gas delivery device, comprising:
a nitric oxide (NO) generating system, including:
a vacuum environment;
an NO cartridge contained within the vacuum environment, the NO cartridge including:
a substrate; and
a solid, light sensitive NO donor immobilized on or in the substrate; and
a light source operatively positioned to selectively expose the solid, light sensitive NO donor to light to generate NO gas; and
an outlet conduit to transport a stream of the NO gas from the NO generating system; and
an inspiratory gas conduit operatively connected to the outlet conduit to introduce an oxygen-containing gas and form an output gas stream of the gas delivery device.

17. The gas delivery device as defined in claim 16 wherein the solid, light sensitive NO donor is immobilized on the substrate with an adhesive, and wherein the NO cartridge further includes a membrane positioned on the solid, light sensitive NO donor, the membrane being NO permeable and transparent to the light.

18. The gas delivery device as defined in claim 17 wherein the membrane is nanoporous or microporous.

19. The gas delivery device as defined in claim 18 wherein the membrane is a polycarbonate membrane.

20. The gas delivery device as defined in claim 16 wherein the solid, light sensitive NO donor is immobilized in a cavity formed on the substrate.

21. The gas delivery device as defined in claim 16, further comprising:
a sensor in contact with the output gas stream to monitor a nitric oxide level of the output gas stream; and
a controller operatively connected to the sensor and to the light source, the controller to adjust a parameter of the light source in response to the nitric oxide level from the sensor.

22. The gas delivery device as defined in claim 16, further comprising:
a delivery conduit operatively connected to the outlet conduit and the inspiratory gas conduit; and
an inhalation unit operatively connected to the delivery conduit and selected from the group consisting of a ventilator, a face mask, and a nasal cannula.

23. The gas delivery device as defined in claim 22, further comprising a nitrogen dioxide filter positioned in the delivery conduit to receive the output gas stream before it is delivered to the inhalation unit.

24. The gas delivery device as defined in claim 16 wherein the solid, light sensitive NO donor is a light sensitive S-nitrosothiol.

25. The gas delivery device as defined in claim 24 wherein the light sensitive S-nitrosothiol is selected from the group consisting of S-nitroso-N-acetyl-penicillamine crystals, S-nitrosoglutathione crystals, and combinations thereof.

26. The gas delivery device as defined in claim 16 wherein the solid, light sensitive NO donor is immobilized in the substrate, and wherein the substrate is silicone rubber.

27. The gas delivery device as defined in claim 16 wherein an $NO_2$ level in the output gas stream is less than 1 parts per million by volume (ppmv).

28. A gas delivery device, comprising:
a nitric oxide (NO) generating system, including:
a chamber having interior and exterior surfaces;
an NO cartridge contained within the chamber, the NO cartridge consisting of:
a nitric oxide permeable substrate; and
a solid, light sensitive NO donor immobilized in the nitric oxide permeable substrate;
a light source attached to either i) the exterior surface or ii) the interior surface and spaced from the NO cartridge, wherein the light source is operatively positioned on the exterior or interior surface to selectively expose the solid, light sensitive NO donor to light to generate NO gas;
an inlet conduit to deliver nitrogen gas to the chamber;
an outlet conduit to transport a stream of nitrogen gas and NO gas from the chamber; and
an inspiratory gas conduit operatively connected to the outlet conduit to introduce an oxygen-containing gas and form an output gas stream of the gas delivery device.

29. The gas delivery device as defined in claim 28 wherein an $NO_2$ level in the output gas stream is less than 1 parts per million by volume (ppmv).

30. A gas delivery device, comprising:
a nitric oxide (NO) generating system, including:
a vacuum chamber;
an NO cartridge contained within the vacuum chamber, the NO cartridge including:
a substrate; and
a solid, light sensitive NO donor immobilized on or in the substrate; and
a light source operatively positioned to selectively expose the solid, light sensitive NO donor to light to generate NO gas;
an inlet conduit to deliver nitrogen gas to the vacuum chamber;
an outlet conduit to transport a stream of nitrogen gas and NO gas from the vacuum chamber; and
an inspiratory gas conduit operatively connected to the outlet conduit to introduce an oxygen-containing gas and form an output gas stream of the gas delivery device.

31. A gas delivery device, comprising:
a nitric oxide (NO) generating system, including:
a chamber having interior and exterior surfaces;
an NO cartridge contained within the chamber, the NO cartridge consisting of:
a nitric oxide permeable substrate; and
a solid, light sensitive NO donor immobilized in the nitric oxide permeable substrate;
a light source attached to either i) the exterior surface or ii) the interior surface and spaced from the solid, light sensitive NO donor, wherein the light source is operatively positioned on the exterior or interior surface to selectively expose the solid, light sensitive NO donor to light to generate NO gas;
an inlet conduit to deliver an oxygen-containing gas to the chamber;
an outlet conduit to transport a stream of at least the oxygen-containing gas and the NO gas from the chamber to a delivery conduit; and
a nitrogen dioxide filter positioned to receive the stream before it is delivered to the delivery conduit.

32. The gas delivery device as defined in claim 31 wherein an $NO_2$ level in the stream is less than 1 parts per million by volume (ppmv).

33. A method, comprising:
generating nitric oxide gas by selectively applying light from a light source to a solid, light sensitive NO donor immobilized on a surface of a substrate by an adhesive sandwiched between the solid, light sensitive NO donor and the substrate contained in a cartridge, wherein the light source is spaced from the cartridge;

mixing the nitric oxide gas with an oxygen-containing gas to form an output gas stream; and monitoring a nitric oxide level and a nitrogen dioxide level of the output gas stream at least prior to delivery to an inhalation unit.

34. The method as defined in claim 33 wherein the solid, light sensitive NO donor is immobilized on the substrate, and wherein the method further comprises sweeping the nitric oxide gas with nitrogen gas prior to the mixing with the oxygen-containing gas.

35. The method as defined in claim 33, further comprising transmitting the output gas stream through a nitrogen dioxide filter prior to the delivery.

36. The method as defined in claim 33 wherein the solid, light sensitive NO donor is immobilized on the substrate and an NO permeable and light transparent membrane is positioned on the solid, light sensitive NO donor, and wherein the oxygen-containing gas is air.

37. The method as defined in claim 33 wherein:
the substrate is a light transparent substrate;
the adhesive is a light transparent adhesive; and
the light is selectively applied through the light transparent substrate.

38. A method, comprising:
generating nitric oxide gas by selectively applying light to a solid, light sensitive NO donor immobilized on or in a substrate in a vacuum chamber;
mixing the nitric oxide gas with an oxygen-containing gas to form an output gas stream; and
monitoring a nitric oxide level and a nitrogen dioxide level of the output gas stream at least prior to delivery to an inhalation unit.

* * * * *